United States Patent
Youn et al.

(10) Patent No.: US 12,299,229 B2
(45) Date of Patent: May 13, 2025

(54) TOUCH DISPLAY DEVICE

(71) Applicant: LG Display Co., Ltd., Seoul (KR)

(72) Inventors: Changhee Youn, Paju-si (KR);
KunYoung Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/231,041

(22) Filed: Aug. 7, 2023

(65) Prior Publication Data

US 2024/0160311 A1 May 16, 2024

(30) Foreign Application Priority Data

Nov. 15, 2022 (KR) .................. 10-2022-0152690

(51) Int. Cl.
*G06F 3/041* (2006.01)

(52) U.S. Cl.
CPC ............. *G06F 3/04164* (2019.05); *G06F 2203/04107* (2013.01)

(58) Field of Classification Search
CPC ....... G06F 3/04164; G06F 2203/04107; G06F 3/0412; G06F 3/0443; G06F 3/0446; G06F 3/046; H10K 50/844; H10K 59/40
See application file for complete search history.

(56) References Cited

U.S. PATENT DOCUMENTS

| | | | |
|---|---|---|---|
| 2007/0126710 A1* | 6/2007 | Chen | G06F 1/169 345/173 |
| 2021/0064172 A1* | 3/2021 | Lee | G06F 3/0412 |
| 2021/0202601 A1* | 7/2021 | Yuan | G09G 3/20 |
| 2024/0045529 A1* | 2/2024 | Fang | G06F 3/0412 |

\* cited by examiner

*Primary Examiner* — Sahlu Okebato
(74) *Attorney, Agent, or Firm* — Fenwick & West LLP

(57) ABSTRACT

A touch display device includes a shielding electrode disposed between a touch electrode and a signal line for driving the display. The shielding electrode enables a generation of a compensation voltage based on a feedback signal received from the shielding electrode. The compensation voltage compensates for noise on a voltage that is applied to the shielding electrode due to direct or indirect coupling between the signal line and the touch electrode. Thus, noise is reduced in a touch sensing signal according to display driving, and improving the performance of touch sensing.

20 Claims, 15 Drawing Sheets

TOUCH DISPLAY DEVICE

CROSS-REFERENCE TO RELATED APPLICATION

This application claims the priority benefit of Republic of Korea Patent Application No. 10-2022-0152690, filed on Nov. 15, 2022 in the Korean Intellectual Property Office, which is hereby herein by reference in its entirety.

BACKGROUND

Technical Field

The present disclosure relates to electronic devices, and more particularly, to touch display devices.

Description of the Related Art

Display devices such as touch sensing enabled display devices can detect a touch input by a finger of a user, a pen, or the like on a display panel, and perform a predefined operation such as presenting images, processing data, and the like based on the detected touch input.

In general, such display devices can provide a function of sensing a touch input from a user by using a plurality of touch electrodes disposed on a display panel or embedded in the display panel.

Such touch electrodes included in the display devices may be located adjacent to signal lines or electrodes for display driving disposed in the display panel.

This configuration may cause parasitic capacitance to be formed between the touch electrodes and the electrodes for display driving. In typical touch sensing enabled display devices, due to such parasitic capacitance, noise in a touch sensing signal detected through touch electrodes may occur, and thereby, the performance of touch sensing may be reduced.

SUMMARY

To address these issues, one or more embodiments of the present disclosure may provide a display device capable of reducing noise in a touch sensing signal caused by display driving, and improving the performance of touch sensing based on touch electrodes included in the display device.

In one embodiment, a touch display device comprises: a substrate comprising an active area and a non-active area outside of the active area, the active area comprising a plurality of subpixels; a plurality of signal lines and a plurality of power lines over the substrate; a plurality of light emitting elements over the plurality of signal lines and the plurality of power lines; an encapsulation layer on the plurality of light emitting elements; a plurality of touch electrodes on the encapsulation layer; a shielding electrode between a layer that comprises the plurality of signal lines and a layer that comprises the plurality of light emitting elements, the shielding electrode electrically connected to at least one power line from the plurality of power lines; at least one feedback line electrically connected to the shielding electrode; and a feedback circuit configured to receive a feedback signal from the shielding electrode via the at least one feedback line, and output a compensation voltage based on the feedback signal to the at least one power line that is electrically connected to the shielding electrode.

In one embodiment, a touch display device comprises: a plurality of power lines configured to supply voltages to a plurality of subpixels disposed in a display panel for display driving; a shielding electrode between a layer that comprises a plurality of signal lines that are configured to supply signals to the plurality of subpixels for display driving and a layer that comprises a plurality of touch electrodes included in the display panel, the shielding electrode electrically connected to at least one power line from the plurality of power lines; at least one feedback line electrically connected to the shielding electrode; and a feedback circuit configured to receive a feedback signal from the shielding electrode via the at least one feedback line, and output a compensation voltage based on the feedback signal to the at least one power line that is electrically connected to the shielding electrode.

In one embodiment, a touch display device comprises: a plurality of light emitting elements in an active area of the touch display device; an encapsulation layer on the plurality of light emitting elements; a plurality of touch electrodes on the encapsulation layer; a shielding electrode between the encapsulation layer and the plurality of touch electrodes; at least one feedback line electrically connected to the shielding electrode; and a feedback circuit configured to receive a feedback signal from the shielding electrode via the at least one feedback line, and output a compensation voltage based on the feedback signal to the shielding electrode.

In one embodiment, a touch display device comprises: a substrate including an active area and a non-active area outside of the active area; a signal line on the active area of the substrate, the signal line supplying a data signal; a power line on the substrate, the power line supplying a first voltage; a light emitting element in the active area, the light emitting element configured to emit light according to the data signal; an encapsulation layer over the light emitting element; a plurality of touch electrodes on the encapsulation layer; a shielding electrode between the signal line and the plurality of touch electrodes, the shielding electrode connected to the power line and receives the first voltage from the power line; a feedback line connected to the shielding electrode, the feedback line receiving a feedback signal from the shielding electrode that is indicative of noise on the first voltage supplied to the shielding electrode due to the data signal; and a feedback circuit connected to the feedback line, the feedback circuit configured to receive the feedback signal via the feedback line and output a second voltage to the power line that is based on the first voltage and the feedback signal.

According to one or more embodiments of the present disclosure, a touch display device may be provided that is capable of reducing noise in a touch sensing signal caused by display driving and improving touch sensing performance by reducing parasitic capacitance directly or indirectly formed between touch electrodes and electrodes for display driving.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
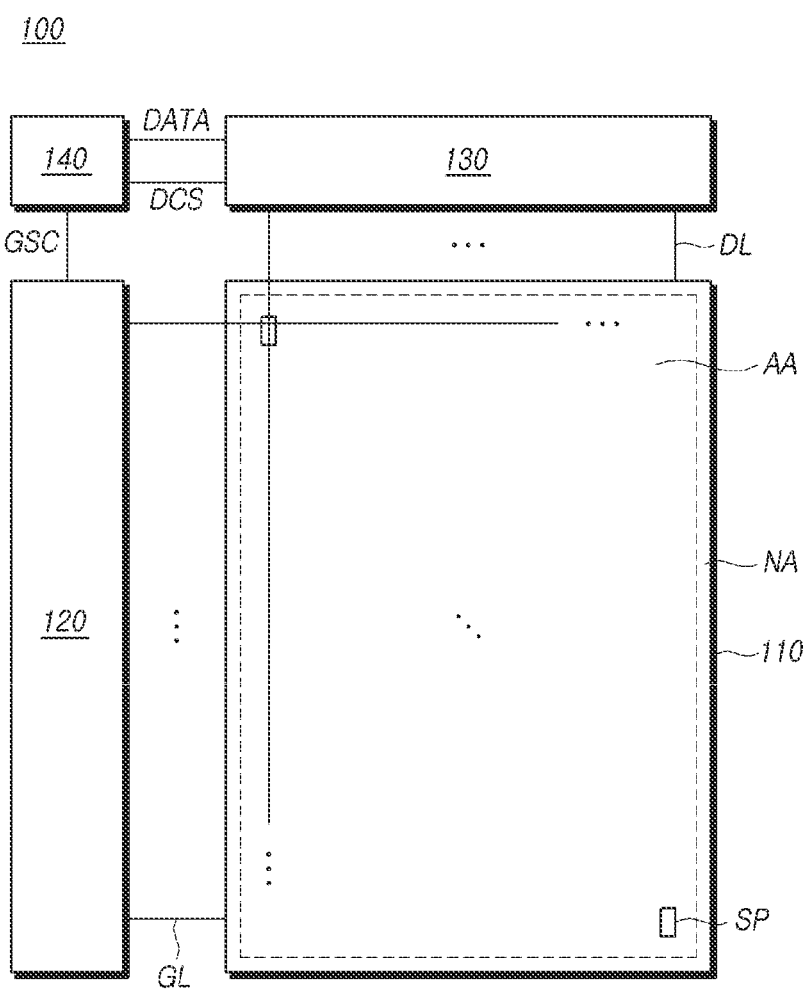
FIG. 1 illustrates an example touch display device according to one embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Terms, such as "first", "second", "A", "B", "(A)", or "(B)" may be used herein to describe elements of the present disclosure. These terms are used only to distinguish one element from another. For example, a first element could be termed a second element, and, similarly, a second element could be termed a first element, without departing from the scope of the present disclosure.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Figure 2:
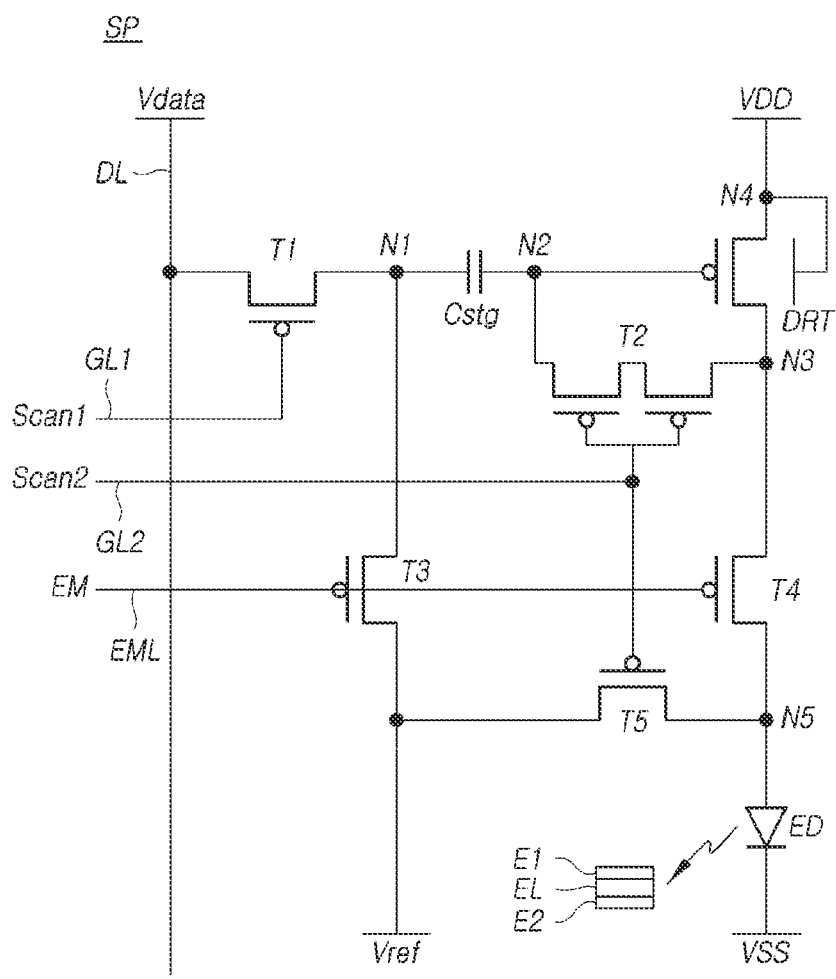
FIG. 2 illustrates an example equivalent circuit of a subpixel included in the touch display device according to one embodiment of the present disclosure.

FIG. 1 illustrates an example touch display device 100 according to one embodiment of the present disclosure. FIG. 2 illustrates an example equivalent circuit of a subpixel SP included in the touch display device 100 according to one embodiment of the present disclosure.

Referring to FIGS. 1 and 2, the touch display device 100 may include a display panel 110, a gate driving circuit 120, a data driving circuit 130, and a controller 140, which are configured to drive the display panel 110.

The touch display device 100 may further include elements for touch sensing in addition to these elements for display driving.

The display panel 110 may include an active area AA in which a plurality of subpixels SP are disposed, and a non-active area NA located outside of the active area AA (e.g., around the active area AA). A plurality of gate lines GL and a plurality of data lines DL may be disposed in the display panel 110. A plurality of subpixels SP may be located in areas in which the gate lines GL and the data lines DL intersect each other.

The gate driving circuit 120 may be controlled by the controller 140. The gate driving circuit 120 can control driving timings of the plurality of subpixels SP by sequentially outputting scan signals to the plurality of gate lines GL disposed in the display panel 110.

The gate driving circuit 120 may include one or more gate driver integrated circuits GDIC. The gate driving circuit 120 may be located in only one side or portion (e.g., a left edge, a right edge, an upper edge, a lower edge, or the like), or in two sides or portions (e.g., a left edge and a right edge, an upper edge and a lower edge, or the like) of the display panel 110 according to design requirements.

In one or more embodiments, each gate driver integrated circuit GDIC may be connected to a respective bonding pad of the display panel 110 in a tape automated bonding (TAB) type or in a chip on glass (COG) type. In one or more embodiments, each gate driver integrated circuit GDIC may be directly disposed in the display panel 110 in a gate in panel (GIP) type. In one or more embodiments, each gate driver integrated circuit GDIC may be disposed in the display panel 110 such that it is integrated with the display panel 110. In one or more embodiments, each gate driver integrated circuit GDIC may be implemented such that it is mounted on a film connected to the display panel 110 in the chip on film (COF) type.

The data driving circuit 130 can receive image data DATA from the controller 140, and convert the received image data DATA into data voltages Vdata in the form of analog. The data driving circuit 130 can output the data voltages to respective data lines DL according to timings at which scan signals through the gate lines GL are applied, and enable each subpixel SP to emit light corresponding to the image data.

The data driving circuit 130 may include one or more source driver integrated circuits SDIC. Each source driver integrated circuit SDIC may include a shift register, a latch circuit, a digital to analog converter, an output buffer, and the like.

In one or more embodiments, each source driver integrated circuit SDIC may be connected to a respective bonding pad of the display panel 110 in the tape automated bonding (TAB) type or in the chip on glass (COG) type. In one or more embodiments, each source driver integrated circuit SDIC may be directly disposed in the display panel 110. In one or more embodiments, each source driver integrated circuit SDIC may be disposed in the display panel 110 such that it is integrated with the display panel 110. In one or more embodiments, each source driver integrated circuit SDIC may be implemented in the chip on film (COF) type. In these embodiments, each source driver integrated circuit SDIC may be mounted on a film connected to the display panel 110, and be electrically connected to the display panel 110 through a line on the film.

The controller 140 can supply various control signals to the gate driving circuit 120 and the data driving circuit 130, and control operation of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through the printed circuit board or the flexible printed circuit.

The controller 140 may control the gate driving circuit 120 to output scan signals according to a respective timing set in each frame. The controller 140 can convert image data received from an external device or system (e.g., a host system) to a data signal form interpretable by the data driving circuit 130, and then supply image data DATA resulting from the converting to the data driving circuit 130.

The controller 140 can receive, in addition to input image data, several types of timing signals including a vertical synchronous signal VSYNC, a horizontal synchronous signal HSYNC, an input data enable signal DE, a clock signal CLK, and the like from the external device or system (e.g., the host system).

The controller 140 can generate several types of control signals using the several types of timing signals received from the external device or system (e.g., the host system), and output the generated signals to the gate driving circuit 120 and the data driving circuit 130.

For example, in order to control the gate driving circuit 120, the controller 140 may supply, to the gate driving circuit 120, several types of gate control signals GCS including a gate start pulse GSP, a gate shift clock GSC, a gate output enable signal GOE, and the like.

The gate start pulse GSP can be used for controlling a respective start timing of one or more gate driver integrated circuits GDIC included in the gate driving circuit 120. The gate shift clock GSC, which is a clock signal commonly inputted to one or more gate driver integrated circuits GDIC, can be used for controlling a shift timing of a scan signal. The gate output enable signal GOE can be used for designating timing information of one or more gate driver integrated circuits GDIC.

In order to control the data driving circuit 130, the controller 140 may supply to the data driving circuit 130, several types of data control signals DCS including a source start pulse SSP, a source sampling clock SSC, a source output enable (SOE) signal, and the like.

The source start pulse SSP can be used for controlling a respective data sampling start timing of one or more source driver integrated circuits SDIC included in the data driving circuit 130. The source sampling clock SSC can be a clock signal used for controlling a respective sampling timing of one or more source driver integrated circuits SDIC. The source output enable (SOE) signal can be used for controlling output timings of the data driving circuit 130.

The touch display device 100 can supply several types of voltage or current to the display panel 110, the gate driving circuit 120, the data driving circuit 130, and the like, or may further include a power management integrated circuit for controlling several types of voltage or current to be supplied.

Each subpixel SP may be an area defined by intersection of one or more gate lines GL and one or more data lines DL. According to a type of the display device 100, a liquid crystal layer or a light emitting element may be disposed in the subpixel SP.

In an embodiment where the touch display device 100 is an organic light emitting display device, organic light emitting diodes (OLED) and circuit elements may be disposed in the subpixels SP. By controlling current supplied to an organic light emitting diode (OLED) using circuit elements, each subpixel SP can operate to emit light at a brightness corresponding to respective image data.

In one or more embodiments, light emitting diodes (LED), micro light emitting diodes (pLED), or quantum dot light emitting diodes (QLED) may be disposed in the subpixels SP.

Referring to FIG. 2, each of a plurality of subpixels SP may include a light emitting element ED. The subpixel SP may include a driving transistor DRT configured to control driving current supplied to the light emitting element ED.

For operation of the subpixel SP, the subpixel SP may include at least one circuit element in addition to the light emitting element ED and the driving transistor DRT.

For example, the subpixel SP may include a first transistor T1, a second transistor T2, a third transistor T3, a fourth transistor T4, a fifth transistor T5, and a storage capacitor Cstg.

FIG. 2 illustrates a structure in which 6 transistors and 1 capacitor are disposed in the subpixel SP (which may be referred to as a 6T1C structure), but embodiments of the present disclosure are not limited thereto. Although P-type transistors are used in the example of FIG. 2, at least one or more of the transistors disposed in the subpixel SP may be N-type transistors.

In one or more embodiments, the transistors disposed in the subpixel SP may include a semiconductor layer formed using low temperature polysilicon (LTPS) or a semiconductor layer formed using an oxide semiconductor. In one or more embodiments, one or more transistors including a semiconductor layer formed using low temperature polysilicon (LTPS) and one or more transistors a semiconductor layer formed using an oxide semiconductor may be disposed in combination in the subpixel SP.

The first transistor T1 may be electrically connected between a data line DL and a first node N1. The first transistor T1 can be controlled by a first scan signal Scan1 supplied through a first scan line GL1. The first transistor T1 can allow a data voltage Vdata to be applied to the first node N1.

The second transistor T2 may be electrically connected between a second node N2 and a third node N3. The second node N2 may be a gate node of the driving transistor DRT. The third node N3 may be a drain node or a source node of the driving transistor DRT. The second transistor T2 can be controlled by a second scan signal Scan2 supplied through a second scan line GL2. The second transistor T2 can perform an operation of compensating for a change in the threshold voltage of the driving transistor DRT.

The third transistor T3 may be electrically connected between a line to which a reference voltage Vref is supplied and the first node N1. The third transistor T3 can be controlled by an emission control signal EM supplied through an emission control line EML. The third transistor T3 can allow the first node N1 to be discharged or the reference voltage Vref to be applied to the first node N1.

The fourth transistor T4 may be electrically connected between the third node N3 and a fifth node N5. The fifth node N5 may be a node electrically connected to the light emitting element ED. The fourth transistor T4 can be controlled by the emission control signal EM supplied through the emission control line EML. The fourth transistor T4 can control timing at which driving current is supplied to the light emitting element ED.

The fifth transistor T5 may be electrically connected between the line to which the reference voltage Vref is supplied and the fifth node N5. The fifth transistor T5 can be controlled by the second scan signal Scan2 supplied through the second gate line GL2. The fifth transistor T5 can allow the fifth node N5 to be discharged or the reference voltage Vref to be applied to the fifth node N5.

The driving transistor DRT may be electrically connected between a fourth node N4 and the third node N3. The fourth node N4 may be electrically connected to a line to which a first driving voltage VDD is supplied. The first driving voltage VDD may be, for example, a high level driving voltage. The fourth node N4 may be the source node or the drain node of the driving transistor DRT. Hereinafter, the term "first driving voltage VDD" may refer to a voltage supplied to the source or drain node of each driving transistor DRT.

The driving transistor DRT can be controlled by a difference between a voltage at the second node N2 and a voltage at the fourth node N4. The driving transistor DRT can control driving current supplied to the light emitting element ED.

The driving transistor DRT may include a back gate electrode electrically connected to the fourth node N4. The output of a driving current by the driving transistor DRT can be stably performed by the back gate electrode electrically connected to the source node or the drain node of the driving transistor DRT. For example, the back gate electrode may be implemented using a metal layer for blocking external light from being incident into the channel of the driving transistor DRT.

The light emitting element ED may be electrically connected between the fifth node N5 and a line to which a second driving voltage VSS is supplied. The second driving voltage VSS may be, for example, a low level driving voltage that is less than the first driving voltage VDD.

The light emitting element ED may include a first electrode layer E1 electrically connected to the fifth node N5, a second electrode layer E2 to which the second driving voltage VSS is applied, and an emission layer EL disposed between the first electrode layer E1 and the second electrode layer E2. Hereinafter, the term "second driving voltage VSS" may refer to a voltage supplied to a second electrode layer E2 of each light emitting element ED. The first electrode layer E1 may be an anode electrode of the light emitting element ED. The second electrode layer E2 may be a cathode electrode of the light emitting element ED.

The light emitting element ED can emit light at brightness corresponding to a driving current supplied by the driving transistor DRT. The operation timing of the light emitting element ED can be controlled by the fourth transistor T4.

The operation timing of the subpixel SP shown in FIG. 2 can be briefly described as follows. A second scan signal Scan2 having a turn-on level can be supplied through the second scan line GL2. In an example where the transistors disposed in the subpixel SP are P-type transistors, the turn-on level may be a low level.

The second transistor T2 and the fifth transistor T5 can be turned on by the second scan signal Scan2 having the turn-on level.

As the second transistor T2 is turned on, the second node N2 and the third node N3 can be electrically connected. A voltage from the first driving voltage VDD after the threshold voltage of the driving transistor DRT is reflected in the first driving voltage VDD can be applied to the second node N2 through the second transistor T2. Through this process, a change in the threshold voltage of the driving transistor DRT can be compensated for.

As the fifth transistor T5 is turned on, a reference voltage Vref can be applied to the fifth node N5. The fifth node N5 can be initialized.

Thereafter, a first scan signal Scan1 having a turn-on level can be supplied through the first scan line GL1.

The first transistor T1 can be turned on by the first scan signal Scan1 having the turn-on level.

As the first transistor T1 is turned on, a data voltage Vdata can be applied to the first node N1.

The storage capacitor Cstg is in a state where the data voltage Vdata and the voltage from the first driving voltage VDD after the threshold voltage of the driving transistor DRT is reflected in the first driving voltage VDD are applied to both terminals of the storage capacitor Cstg.

Thereafter, a light emitting control signal EM having a turn-on level can be supplied through the light emitting control line EML.

The third transistor T3 and the fourth transistor T4 can be turned on.

As the third transistor T3 is turned on, a voltage at the first node N1 can be changed to a reference voltage Vref. A voltage at the second node N2 coupled to the first node N1 can be changed according to a change in the voltage at the first node N1.

The second node N2 and the fourth node N4 are in a state where a voltage from the first driving voltage VDD after the threshold voltage of the driving transistor DRT and the data voltage Vdata are reflected in the first driving voltage VDD is applied to the second node N2, and the first driving voltage VDD is applied to the fourth node N4. A difference between the voltage at the second node N2 and the voltage at the fourth node N4 may be a voltage in which the data voltage Vdata and the threshold voltage of the driving transistor DRT are reflected. A driving current corresponding to the data voltage Vdata can be supplied by the driving transistor DRT.

As the fourth transistor T4 is turned on, the driving current supplied by the driving transistor DRT can be supplied to the light emitting element ED.

The light emitting element ED can emit light at brightness according to the driving current, and the subpixel SP including the light emitting element ED can present an image corresponding to the image data.

In one or more embodiments, the touch display device 100 according to aspects of the present disclosure may include a touch sensor structure implemented in the display panel 110 for displaying an image, and provide a function of sensing the touch of a user on the display panel 110.

Figure 3:
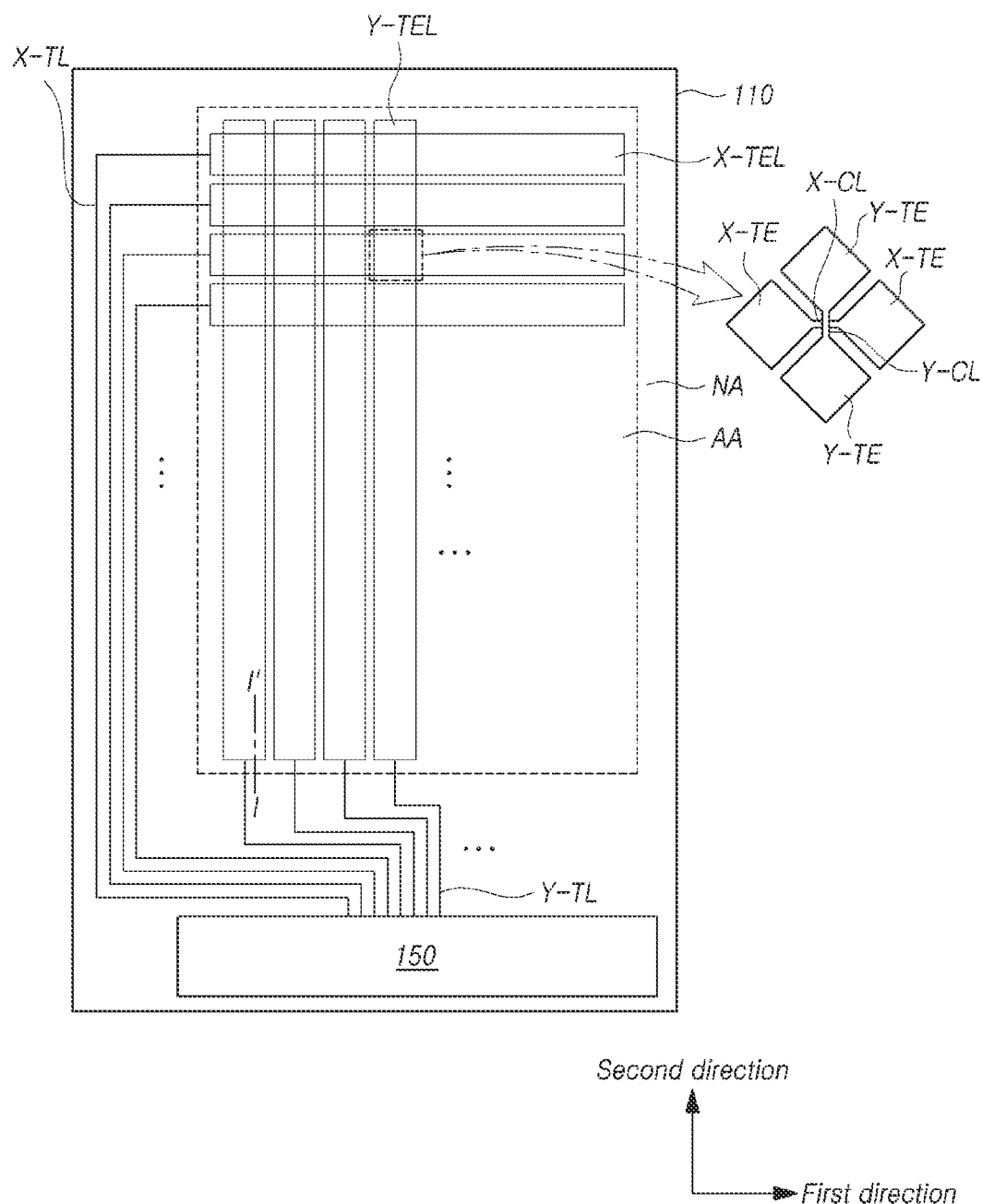
FIG. 3 illustrates an example touch sensor structure included in the touch display device according to one embodiment of the present disclosure.
Figure 4:
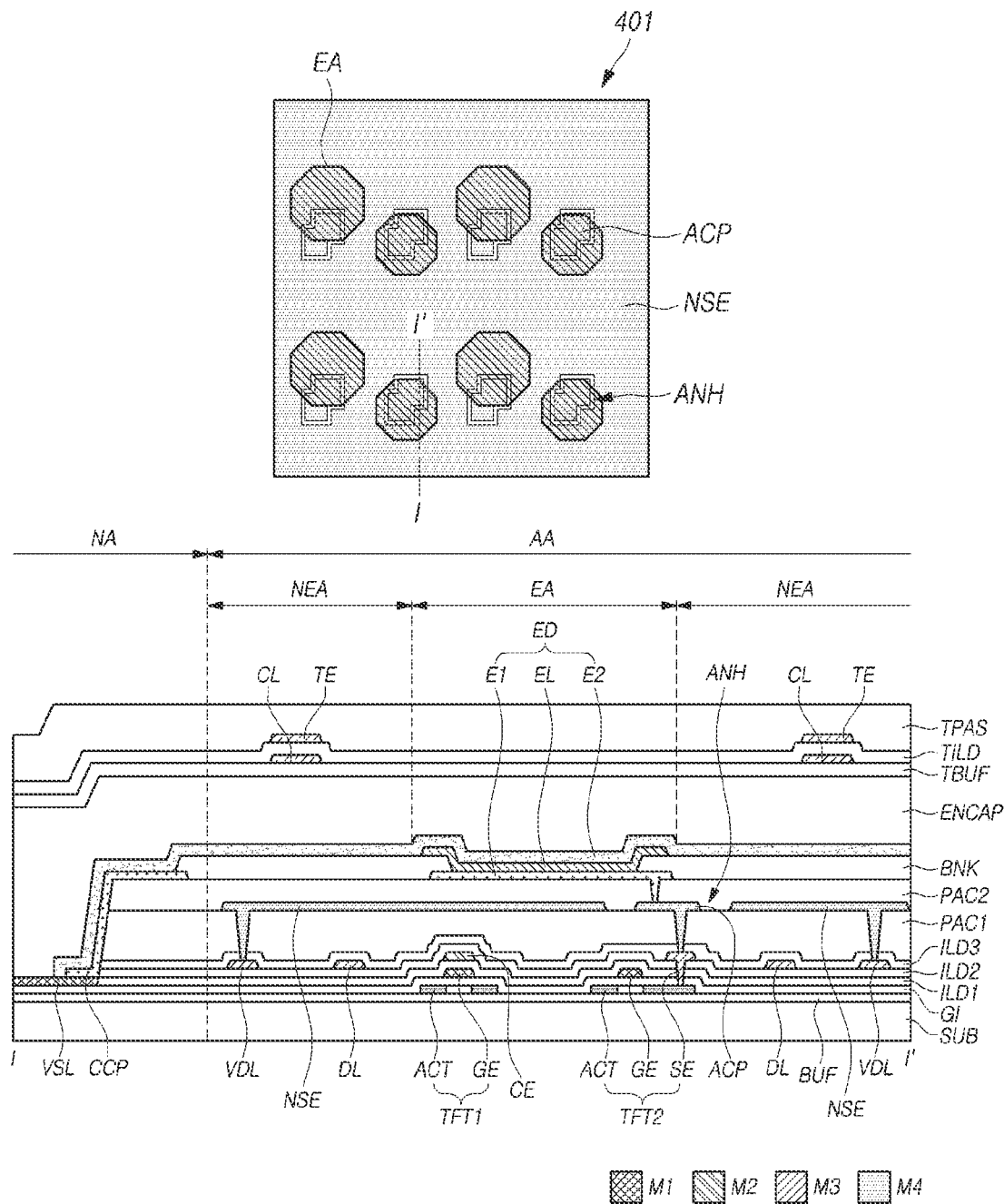
FIG. 4 is an example cross-sectional view taken along line I-I' illustrated in FIG. 3 according to one embodiment of the present disclosure.

FIG. 3 illustrates an example touch sensor structure included in the touch display device 100 according to one embodiment of the present disclosure. FIG. 4 is an example cross-sectional view taken along line I-I' illustrated in FIG. 3 according to one embodiment of the present disclosure.

Referring to FIG. 3, the touch display device 100 may include a plurality of touch electrode arrays (e.g., lines) TEL and a plurality of touch routing lines TL, which are disposed in the display panel 110. The touch display device 100 may include a touch driving circuit 150 configured to drive the plurality of touch electrode arrays TEL and the plurality of touch routing lines TL.

Each of the plurality of touch electrode arrays TEL may be electrically connected to the touch driving circuit 150 through a respective one of the plurality of touch routing lines TL. In one or more embodiments, the touch driving circuit 150 may be disposed such that it is implemented separately from other circuits, or is integrated with one or more circuits for display driving. For example, the touch driving circuit 150 may be integrated with the data driving circuit 130.

Each of the plurality of touch electrode arrays TEL may include a plurality of touch electrodes TE electrically connected to one another in one direction. In one or more embodiments, each of the plurality of touch electrode arrays TEL may include a plurality of touch electrode connection patterns CL for electrically interconnecting a plurality of touch electrodes TE to one another.

For example, each of a plurality of X-touch electrode arrays X-TEL may include a plurality of X-touch electrodes X-TE arranged along a first direction, and a plurality of X-touch electrode connection patterns X-CL for electrically interconnecting the plurality of X-touch electrodes X-TE.

Each of a plurality of Y-touch electrode arrays Y-TEL may include a plurality of Y-touch electrodes Y-TE arranged along a second direction intersecting the first direction, and a plurality of Y-touch electrode connection patterns Y-CL for electrically interconnecting the plurality of Y-touch electrodes Y-TE.

In one or more embodiments, the X-touch electrode arrays X-TEL and the Y-touch electrode arrays Y-TEL may be disposed in different layers. In one or more embodiments, the X-touch electrodes X-TE and the Y-touch electrodes Y-TE may be disposed in a same layer. In these embodiments, any one of the X-touch electrode connection patterns X-CL and the Y-touch electrode connection patterns Y-CL may be disposed on a different layer from one or more touch electrodes TE (e.g., the X-touch electrodes X-TE and/or the Y-touch electrodes Y-TE).

For example, the touch electrodes TE may have a rectangular shape, but is not limited thereto.

The touch electrodes TE may include, for example, a transparent conductive material, and be disposed without interfering with the image display function of the display panel 110.

In another example, the touch electrodes TE may include an opaque metal. In this example, the touch electrodes TE may have open areas corresponding to light emitting areas of light emitting elements ED disposed in the display panel 110. For example, the touch electrodes TE may be implemented in a mesh shape, and be disposed while avoiding the light emitting areas.

Referring to FIG. 4, a substrate SUB may include an active area AA in which a plurality of subpixels SP are disposed, and a non-active area NA located outside of the active area AA.

The active area AA may include a light emitting area EA in which light is emitted by a light emitting element ED and a non-light emitting area NEA, which is an area other than the light emitting area EA. For example, light is not emitted by the light emitting element ED in the non-light emitting area NEA.

A buffer layer BUF may be disposed on the substrate SUB.

At least one thin film transistor TFT (e.g., TFT1 and TFT2) may be disposed on the buffer layer BUF.

The thin film transistor TFT may include an active layer ACT and a gate electrode GE. The thin film transistor TFT may include a source electrode SE and a drain electrode (not shown).

The active layer ACT may be located on the buffer layer BUF. The active layer ACT may include a semiconductor material. The active layer ACT may include amorphous silicon or polycrystalline silicon.

A gate insulating layer GI may be disposed on the active layer ACT.

The gate electrode GE may be located on the gate insulating layer GI. The gate electrode GE may be disposed using a first metal layer M1.

Several signal lines may be disposed using the first metal layer M1.

For example, at least one second power line VSL for supplying the second driving voltage VSS (see FIG. 2) may be disposed using the first metal layer M1.

For example, at least one second power line VSL may be located in the non-active area NA. In one or more embodiments, a respective portion of the at least one second power line VSL or at least one other second power line VSL may be located in the active area AA.

The second power line VSL may be electrically connected to the second electrode layer E2. A second electrode connection pattern CCP may be located in at least a portion of an area between the second power line VSL and the second electrode layer E2.

A first interlayer insulating layer ILD1 may be disposed on the gate electrode GE.

A capacitor electrode CE may be located on the first interlayer insulating layer ILD1. The capacitor electrode CE may be disposed using a second metal layer M2.

The capacitor electrode CE may overlap the gate electrode GE of transistor. The capacitor electrode CE may form a storage capacitor Cstg with a gate electrode GE of a first thin film transistor TFT1. The first thin film transistor TFT1 may be, for example, the driving transistor DRT shown in FIG. 2.

A second interlayer insulating layer ILD2 may be disposed on the capacitor electrode CE.

The source electrode SE may be located on the second interlayer insulating layer ILD2. The source electrode SE may be electrically connected to the active layer ACT through a contact hole. The source electrode SE may be disposed using a third metal layer M3.

Several signal lines may be disposed using the third metal layer M3.

For example, at least one data line DL for supplying a data voltage Vdata may be disposed using the third metal layer M3. At least one first power line VDL for supplying the first driving voltage VDD (see FIG. 2) may be disposed using the third metal layer M3.

For example, at least one first power line VDL may be located in the active area AA. In one or more embodiments, a respective portion of the at least one first power line VDL or at least one other first power line VDL may be located in the non-active area NA.

Each of the data line DL, the first power line VDL, and the second power line VSL may be arranged in various embodiments using at least one or more of the several metal layers.

Although FIG. 4 shows an example in which data lines DL and first power lines VDL are disposed using the third metal layer M3, in one or more embodiments, the data lines DL and the first power lines VDL may be disposed using the first metal layer M1 or the second metal layer M2.

In one or more embodiments, as in the example shown in FIG. 4, the first power line VDL may include a portion formed using the third metal layer M3 and a portion formed using the fourth metal layer M4. Accordingly, the resistance of the first power line VDL can be reduced.

A third interlayer insulating layer ILD3 may be disposed on the third metal layer M3.

A first planarization layer PAC1 may be disposed on the third interlayer insulating layer ILD3. The first planarization layer PAC1 may include, for example, an organic material.

A fourth metal layer M4 may be located on the first planarization layer PAC.

At least one first power line VDL or a respective portion of the at least one first power line VDL may be formed using the fourth metal layer M4.

A first electrode connection pattern ACP may be disposed using the fourth metal layer M4. A second thin film transistor TFT2 and the light emitting element ED may be electrically connected by the first electrode connection pattern ACP. The second thin film transistor TFT2 may be, for example, the fourth transistor T4 or the fifth transistor T5 shown in FIG. 2.

A second planarization layer PAC2 may be disposed on the fourth metal layer M4. The second planarization layer PAC2 may include, for example, an organic material.

The light emitting element ED may be disposed on the second planarization layer PAC2.

A first electrode layer E1 of the light emitting element ED may be located on the second planarization layer PAC2.

A bank layer BNK may be disposed on the second planarization layer PAC2 while exposing a portion of the first electrode layer E1.

An emission layer EL may be located on the first electrode layer E1. The emission layer EL may be located on a portion of the bank layer BNK.

The second electrode layer E2 may be located on the emission layer EL and the bank layer BNK.

The light emitting area EA may be defined by the bank layer BNK.

An encapsulation layer ENCAP may be disposed on the light emitting element ED. The encapsulation layer ENCAP may be formed in a single layer or a multilayer. For example, the encapsulation layer ENCAP may include a first inorganic layer, an organic layer, and a second inorganic layer.

A touch sensor structure may be disposed on the encapsulation layer ENCAP.

For example, a touch buffer layer TBUF may be located on the encapsulation layer ENCAP. The touch buffer layer TBUF may include, for example, an inorganic material. In another example, the touch buffer layer TBUF may not be disposed. In this example, electrodes included in the touch sensor structure may be directly disposed on the encapsulation layer ENCAP.

At least one touch electrode connection pattern CL may be located on the touch buffer layer TBUF.

A touch insulating layer TILD may be located on the touch electrode connection pattern CL. The touch insulating layer TILD may be, for example, an organic material or an inorganic material. In an example where the touch insulating layer TILD is an organic material, a layer including an inorganic material may be further disposed between the touch insulating layer TILD and the touch electrode connection pattern CL.

At least one touch electrode TE may be located on the touch insulating layer TILD.

A touch protective layer TPAS may be disposed on the touch electrode TE.

As the touch electrode TE and the touch electrode connection pattern CL are disposed using a plurality of layers as shown in FIG. 4, the touch sensor structure including the X-touch electrode arrays X-TEL and the Y-touch electrode arrays Y-TEL as shown in FIG. 3 may be implemented in the display panel 110.

The touch electrode TE and the touch electrode connection pattern CL may be disposed while avoiding the light emitting area EA. The touch electrode TE and the touch electrode connection pattern CL may overlap the non-light emitting area NEA.

Since the touch electrode TE and the touch electrode connection pattern CL are disposed on the encapsulation layer ENCAP, and disposed to avoid the light emitting area EA, this touch sensor structure can be implemented in the display panel 110 while not affecting the image display function of the display panel 110.

Although not shown in FIG. 4, in one or more embodiments, a touch routing line TL connected to the touch electrode TE may be disposed along an inclined surface of the encapsulation layer ENCAP. The touch routing line TL may be located in a same layer as the touch electrode TE or a same layer as the touch electrode connection pattern CL. In one or more embodiments, the touch routing line TL may be disposed using two layers. The touch routing line TL may be electrically connected to a pad located in the non-active area NA.

In a structure in which a plurality of X-touch electrode arrays X-TEL and a plurality of Y-touch electrode arrays Y-TEL are disposed to cross each other, the touch driving circuit 150 can perform touch sensing by driving touch electrode arrays TEL through touch routing lines TL.

For example, one of the X-touch electrode arrays X-TEL and the Y-touch electrode arrays Y-TEL may be touch driving electrodes to which a touch drive signal is applied. The other of the X-touch electrode arrays X-TEL and the Y-touch electrode arrays Y-TEL may be touch sensing electrodes from which touch sensing signals are detected.

The touch driving circuit 150 can detect a change in mutual capacitance caused by a touch event from a user in a situation where different signals are applied to the X-touch electrode arrays (X-TEL) and the Y-touch electrode arrays (Y-TEL).

The touch driving circuit 150 can provide sensing data according to a detected change in mutual capacitance to the touch controller. The touch controller can detect the presence or absence of a touch event on the display panel 110 and touch coordinates based on the sensing data received from the touch driving circuit 150.

The touch electrode arrays TEL disposed in the display panel 110 may be divided into a plurality parts and be respectively disposed in a plurality of areas in the active area AA.

As the touch electrode arrays TEL are divided and disposed in each area, the load of the touch electrode arrays TEL can be reduced. When the display panel 110 has an increased area, the touch display device 100 can improve touch sensing performance while enabling the load of the touch electrode arrays TEL to be reduced.

Further, the touch display device 100 may include a structure capable of preventing or at least reducing interference between touch electrodes TE and electrodes for display driving, and reducing noise in a touch sensing signal.

For example, a shielding electrode NSE may be located between a layer in which at least one data line DL is disposed and a layer in which at least one light emitting element ED is disposed in the cross-section view of the display device as shown in FIG. 4. A structure in a plan view indicated by reference number 401 in FIG. 4 represents an example structure in which a shielding electrode NSE is disposed in an area including a plurality of light emitting areas EA.

The shielding electrode NSE may be disposed using, for example, the fourth metal layer M4. The shielding electrode NSE may be disposed in the active area AA, but not the non-active area NA in one embodiment. The shielding electrode NSE may be disposed in an area other than areas in which one or more first electrode connection patterns ACP are disposed using the fourth metal layer M4 in the active area AA. It should be noted here that the structure in the plan view indicated by reference number 401 in FIG. 4 illustrates only a layer in which the fourth metal layer M4 is disposed, and locations of the light emitting areas EA The shielding electrode NSE may be disposed to be separated from one or more first electrode connection patterns ACP. The shielding electrode NSE may include a plurality of first electrode holes ANH through a thickness of the shielding electrode NSE. The first electrode holes ANH are located in areas corresponding to the location of the first electrode connection patterns ACP. The transistor TFT2 may be connected to the light emitting element ED through the electrode hole ANH via the first electrode connection pattern ACP as shown in FIG. 4. As shown in the structure in the plan view indicated by reference number 401 in FIG. 4, in one or more embodiments, the first electrode connection patterns ACP may be located inside of the first electrode holes ANH included in the shielding electrode NSE.

The shielding electrode NSE may overlap at least a respective portion of at least one data line DL. The shielding electrode NSE may overlap at least a respective portion of at least one thin film transistor TFT. Although not shown in FIG. 4, in one or more embodiments, the shielding electrode NSE may overlap at least a portion of at least one gate line GL.

The shielding electrode NSE may be located under a first electrode layer E1 of the light emitting element ED, and be located to overlap at least one thin film transistor TFT or several signal lines, which are located between the substrate SUB and the light emitting element ED.

The shielding electrode NSE may overlap at least a portion of the first electrode layer E1 of the light emitting element ED. The shielding electrode NSE may overlap at least a portion of a second electrode layer E2 of the light emitting element ED. The shielding electrode NSE may overlap at least a portion of an area in which the first electrode layer E1 and the second electrode layer E2 of the light emitting element ED overlap each other.

As shown in the structure in the plan view indicated by reference number 401 in FIG. 4, in one or more embodiments, at least one light emitting area EA may overlap all, or a portion, of a respective first electrode connection pattern ACP. A portion of the light emitting area EA may overlap the shielding electrode NSE. Since the shielding electrode NSE overlaps a portion of the light emitting area EA, the shielding electrode NSE may overlap the second electrode layer E2 located in the light emitting area EA.

Since the shielding electrode NSE is located between at least one signal line and the light emitting element ED, coupling of the signal line with an electrode of the light emitting element ED can be blocked. Hereinafter, the term "coupling" may mean all or any one of magnetic coupling, capacitive coupling, electromagnetic coupling, and/or the like.

For example, the shielding electrode NSE can block coupling between the data line DL and the second electrode layer E2 of the light emitting element ED. A fluctuation in a voltage applied to the second electrode layer E2 due to the coupling between the data line DL and the second electrode layer E2 can be reduced or prevented. Since the voltage fluctuation in the second electrode layer E2 is reduced or prevented, the performance of touch sensing performed by at least one touch electrode TE on the encapsulation layer ENCAP can be prevented from being affected by a fluctuation in the voltage of the second electrode layer E2.

For example, a constant voltage may be supplied to the shielding electrode NSE. Types or shapes, and/or arrangement structure, of lines for supplying a constant voltage to the shielding electrode NSE may be implemented in various embodiments.

In one embodiment, the first driving voltage VDD (see FIG. 2) may be supplied to the shielding electrode NSE.

The shielding electrode NSE may be electrically connected to a first power line VDL for supplying the first driving voltage VDD in the active area AA.

Since the first power line VDL is disposed in the active area AA, a structure in which a constant voltage is supplied to the shielding electrode NSE can be easily implemented through a connection between the shielding electrode NSE and the first power line VDL.

The shielding electrode NSE can block coupling between a signal line and an electrode of the light emitting element ED, and prevent the performance of touch sensing by at least one touch electrode TE on the encapsulation layer ENCAP from being reduced by display driving.

The shielding electrode NSE may be disposed in various forms using any one of several metal layers located under the light emitting element ED. In one or more embodiments, the shielding electrode NSE may be disposed in an area other than an area where the first electrode layer E1 is disposed in a layer where the first electrode layer E1 is disposed.

The shielding electrode NSE can block noise caused by a signal line located under the shielding electrode NSE, and thereby, the performance of touch sensing by a touch electrode TE located on the encapsulation layer ENCAP can be improved.

Further, in order to prevent a voltage supplied to the shielding electrode NSE from fluctuating, noise that may occur by a voltage fluctuation in the shielding electrode NSE itself can also be reduced by supplying a compensation voltage according to a voltage state in the shielding electrode NSE to the shielding electrode NSE.

Figure 5:
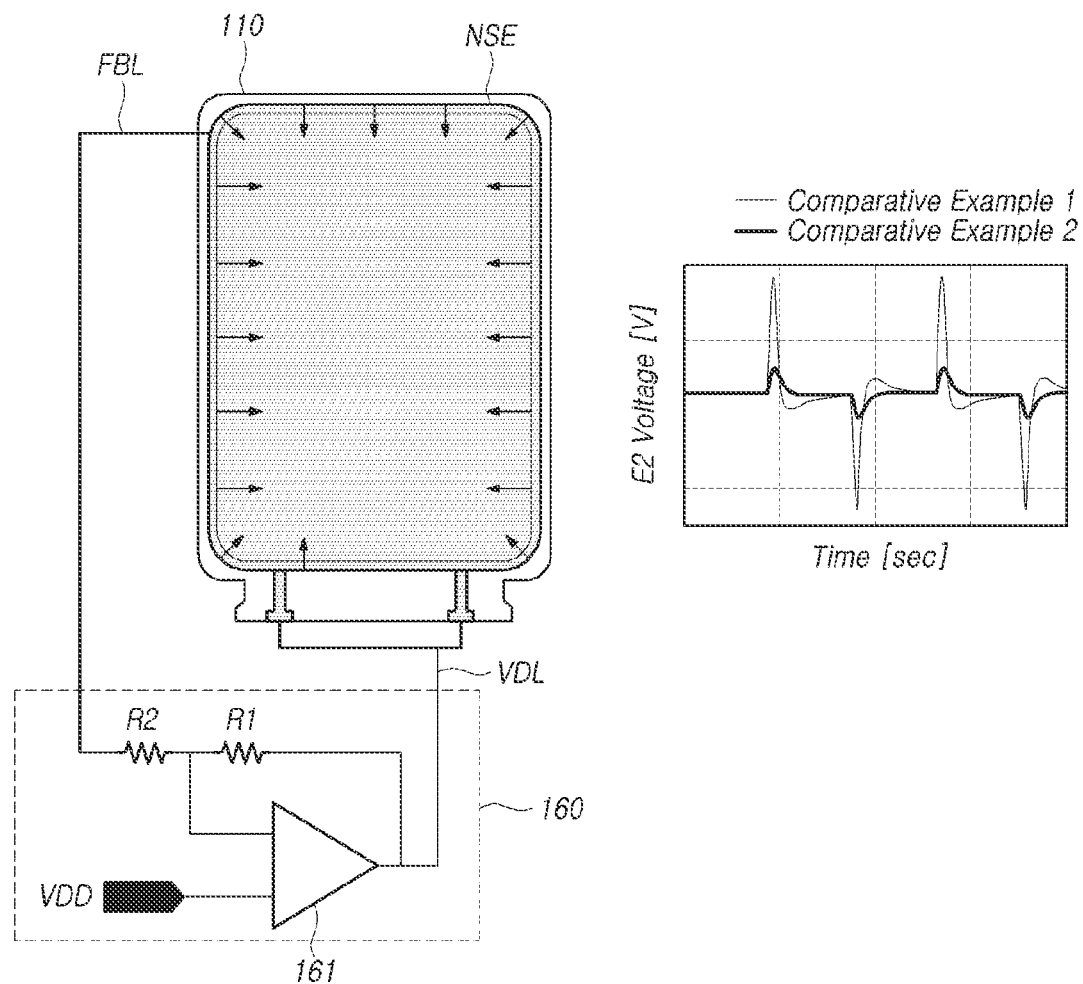
FIG. 5 illustrates an example structure in which a shielding electrode included in the touch display device is connected to a feedback line and a feedback circuit in the touch display device according to one embodiment of the present disclosure.
Figure 6A:
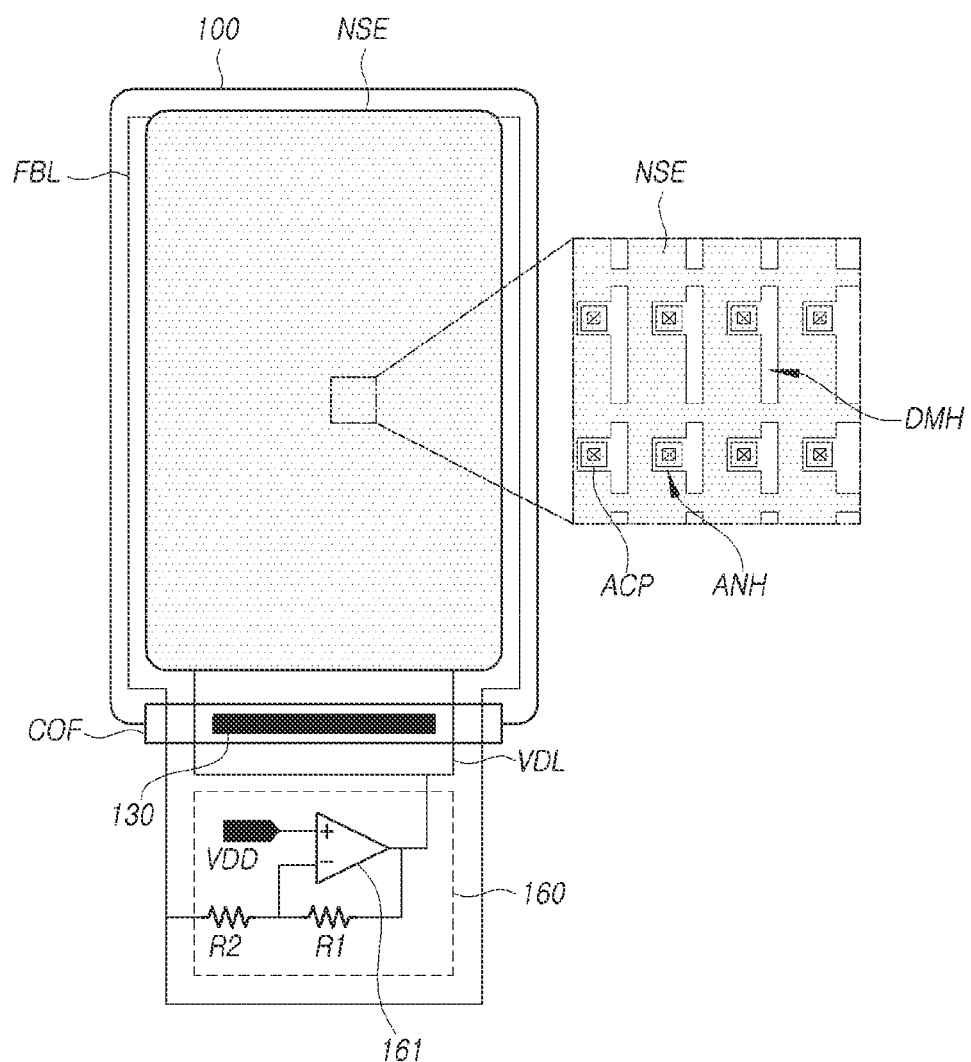
FIGS. 6A to 6C illustrates various example structures in which a shielding electrode included in the touch display device is connected to a feedback line and a feedback circuit in the touch display device according to one embodiment of the present disclosure.
Figure 6B:
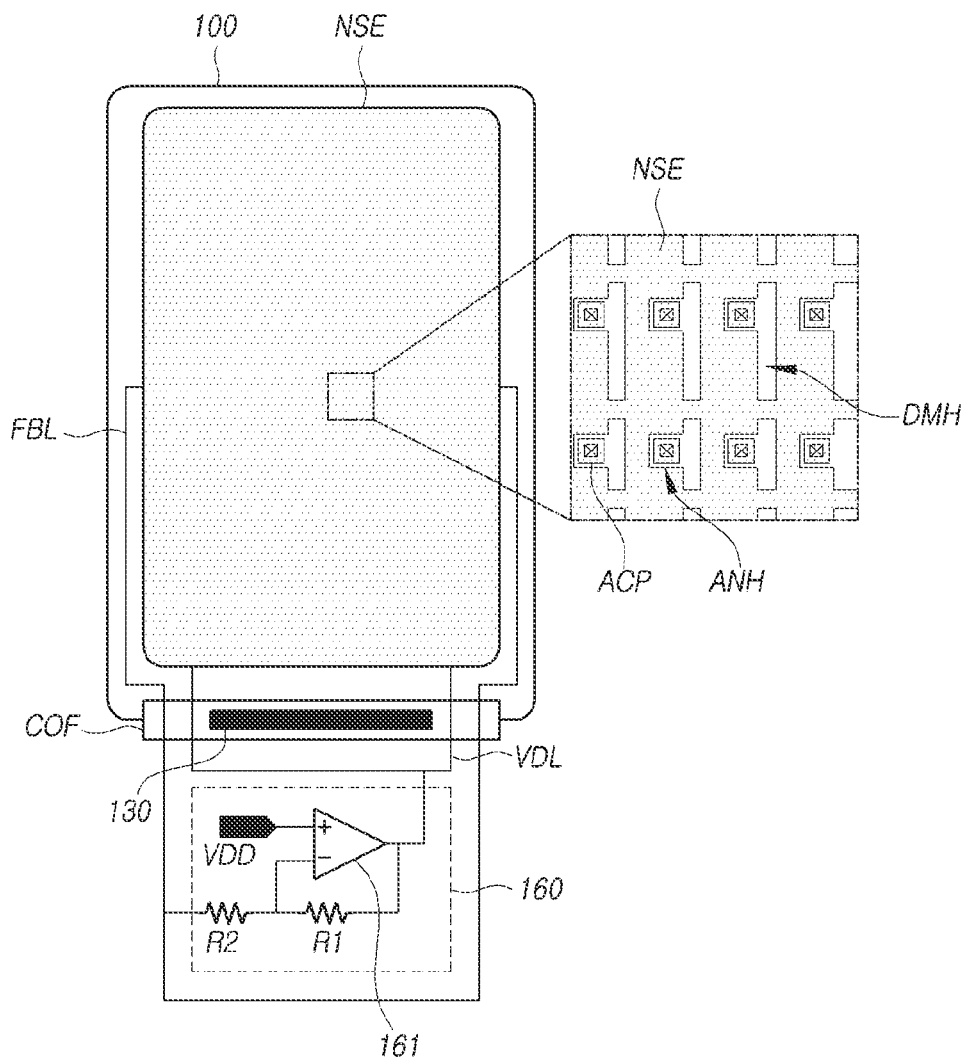
Figure 6C:
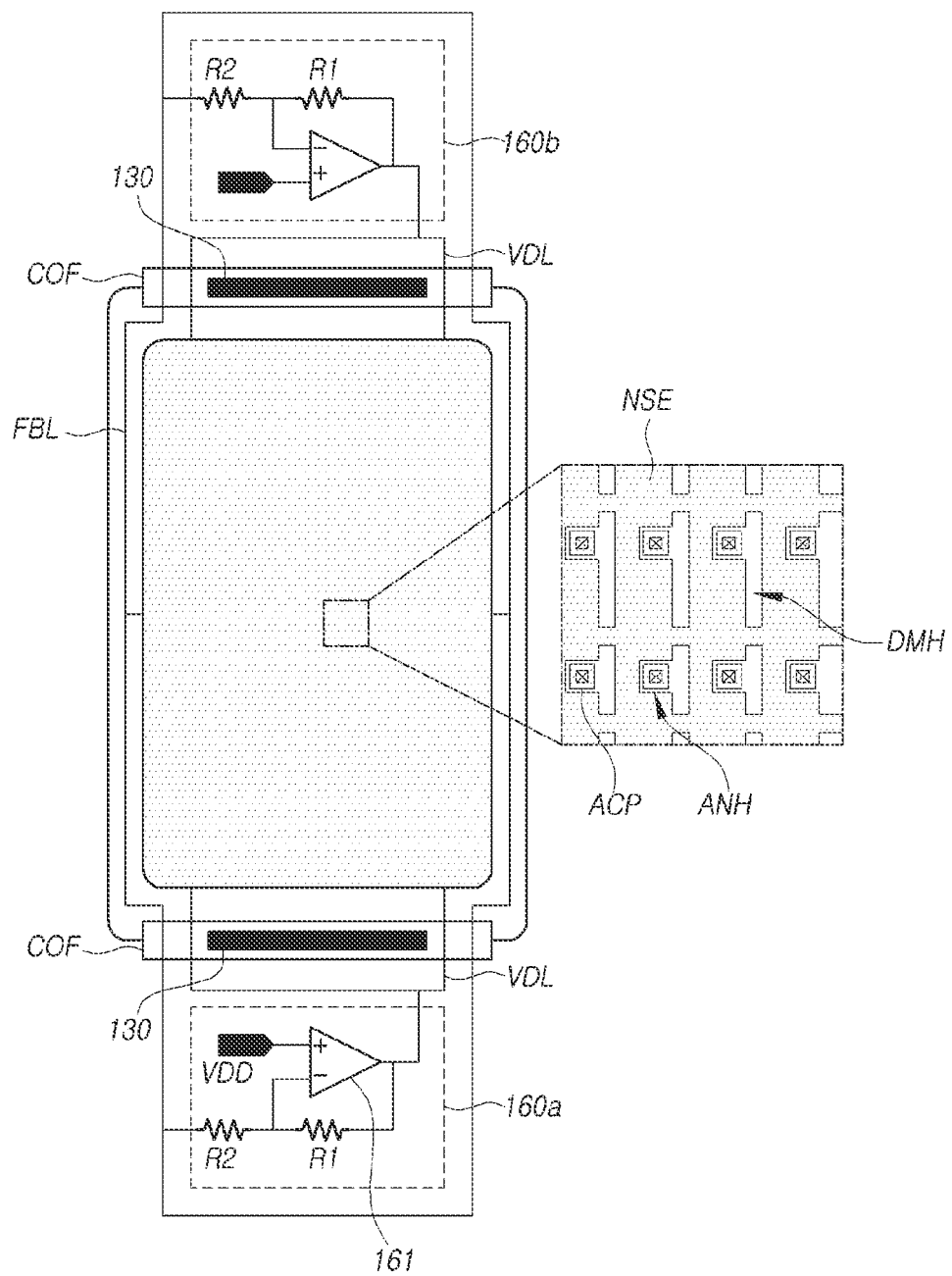

FIG. 5 illustrates an example structure in which a shielding electrode NSE included in the touch display device 100 is connected to a feedback line FBL and a feedback circuit 160 in the touch display device 100 according to embodiments of the present disclosure. FIGS. 6A to 6C illustrates various example structures in which a shielding electrode NSE included in the touch display device 100 is connected to a feedback line FBL and a feedback circuit 160 in the touch display device 100 according to embodiments of the present disclosure.

Referring to FIG. 5, in the display panel 110, a shielding electrode NSE may be disposed between a substrate SUB (e.g., the substrate SUB in FIG. 4) and a layer in which an electrode layer of a light emitting element ED (e.g., the light emitting element ED in FIG. 4) is disposed. For example, a constant voltage may be supplied to the shielding electrode NSE. The example shown in FIG. 5 represents an implementation in which the shielding electrode NSE receives the first driving voltage VDD (see FIG. 2) through a first power line VDL (e.g., the first power line VDL in FIG. 4).

The shielding electrode NSE may be disposed in the active area AA. In one or more embodiments, a portion of the shielding electrode NSE may be disposed in the non-active area NA.

The shielding electrode NSE may be electrically connected to at least one feedback line FBL, as well as being electrically connected to a line, such as the first power line VDL, through which a voltage, such as the first driving voltage VDD, is supplied to the shielding electrode NSE. That is, the shielding electrode NSE is electrically connected to the feedback line FBL and the first power line VDL. The at least one feedback line FBL may be electrically connected to the shielding electrode NSE at one or more points of the shielding electrode NSE.

The feedback line FBL may be electrically connected to a feedback circuit 160. In one or more embodiments, the feedback circuit 160 may be disposed separately from a circuit for display driving or the touch driving circuit 150. In one or more embodiments, the feedback circuit 160 may be integrated with one or more of elements for display driving or at least a portion of the touch driving circuit 150. The feedback circuit 160 may be disposed on a printed circuit board on which one or more other driving circuits are mounted.

The feedback circuit 160 may be electrically connected to the shielding electrode NSE through the feedback line FBL. The feedback circuit 160 may also be electrically connected to the shielding electrode NSE through the first power line VDL. Thus, the feedback circuit 160 is connected to the shielding electrode NSE via the feedback line FBL and the first power line VDL. The feedback circuit 160 can supply the first driving voltage VDD to the shielding electrode NSE through the first power line VDL. The feedback circuit 160 can receive a feedback signal from the shielding electrode NSE through the feedback line FBL. The feedback signal comprises the first driving voltage VDD plus noise due to coupling between the shielding electrode NSE and the data line DL. In one embodiment, the feedback circuit 160 receives the feedback signal constantly or periodically.

The feedback circuit 160 may include, for example, an amplifier 161 (e.g., a circuit), a first resistor R1 and a second resistor R2. Resistance values of the first resistor R1 and the second resistor R2 may have various values. For example, the resistance value of the first resistor R1 may be greater than that of the second resistor R2.

The feedback circuit 160 can invert and amplify the feedback signal received through the feedback line FBL, and then output the signal obtained by inverting and amplifying the feedback signal to the first power line VDL. Specifically, the feedback circuit 160 can output a compensation voltage (e.g., another driving voltage) obtained by adding the signal obtained by inverting and amplifying the feedback signal to the first driving voltage VDD to the first power line VDL. Thus, the shielding electrode NSE is applied to the compensation voltage to account for the noise on the first driving voltage VDD.

Since the feedback circuit 160 outputs, as the first driving voltage VDD, the compensation voltage obtained by adding the signal obtained by inverting and amplifying the feedback signal to the first driving voltage VDD, the ripple (e.g., noise) of the voltage supplied to the shielding electrode NSE can be reduced.

As examples, referring to Comparative Example 1 and Comparative Example 2 shown in FIG. 5, Comparative Example 1 shows an implementation where the shielding electrode NSE is disposed without the feedback circuit 160, and Comparative Example 2 shows an implementation where the shielding electrode NSE supplied with a compensation voltage by the feedback circuit 160 is disposed.

In the implementation where the feedback circuit 160 is not included, even when the shielding electrode NSE is disposed, fluctuations in a voltage of the shielding electrode NSE may occur due to a signal line located under the shielding electrode NSE that is parasitically coupled to the shielding electrode NSE. Accordingly, as in the example shown in Comparative Example 1, ripples (e.g., noise) in the voltage of a second electrode layer E2 (e.g., the second electrode layer E2 in FIG. 4) may occur. Such ripples as noise may affect a touch electrode TE (e.g., the touch electrode TE in FIG. 4) located on the second electrode layer E2.

In contrast, in the implementation where the feedback circuit 160 is included, a compensation voltage, which results from adding a signal obtained by inverting and amplifying a feedback signal received from the shielding electrode NSE to the first driving voltage VDD, can be supplied to the shielding electrode NSE. In this implementation, even when fluctuations in a voltage of the shielding electrode NSE occur due to a signal line located under the shielding electrode NSE, a fluctuation range of the voltage of the shielding electrode NSE can be reduced because the compensation voltage obtained by inverting and amplifying the fluctuations is supplied to the shielding electrode NSE. As shown in Comparative Example 2, the voltage of the second electrode layer E2 may have little or no ripples.

A signal line for supplying a signal for display driving can be prevented from directly affecting the second electrode layer E2 by the shielding electrode NSE. In addition, since a compensation voltage based on a feedback signal is supplied to the shielding electrode NSE, the signal line can be prevented from indirectly affecting the second electrode layer E2 through the shielding electrode NSE.

Noise in a touch sensing signal caused by coupling between the second electrode layer E2 and a touch electrode TE adjacent to the second electrode layer E2 can be prevented or reduced by reducing fluctuations in the voltage of the second electrode layer E2 during display driving. Thereby, the performance of touch sensing by the touch electrodes TE disposed in the display panel 110 can be improved.

An arrangement structure of the feedback line FBL and the feedback circuit 160, which are connected to the shielding electrode NSE, may be formed in various structures so that fluctuations in the voltage of the shielding electrode NSE can be reduced or eliminated.

Referring to FIG. 6A, a shielding electrode NSE may be disposed in the active area AA of the display panel 110 according to one embodiment. In this implementation, a portion of the shielding electrode NSE may be disposed in the non-active area NA.

The shielding electrode NSE may be disposed in at least a portion of an area where an electrode layer of a light emitting element ED and a signal line on the substrate SUB overlap in the active area AA.

In one or more embodiments, the shielding electrode NSE may include at least one hole.

For example, the shielding electrode NSE may include an electrode hole ANH in which a first electrode connection pattern ACP is disposed that electrically interconnect a thin film transistor and a first electrode layer E1 of the light emitting element ED, which are located over the substrate SUB.

In one or more embodiments, the shielding electrode NSE may include at least one dummy hole DMH. The dummy hole DMH may be located in an area other than an area overlapping a signal line located under the shielding electrode NSE. For example, the dummy hole DMH may be located in an area other than an area overlapping a data line DL. The dummy hole DMH can provide a path through which gas generated in a process of at least one thin film transistor TFT located under the shielding electrode NSE and/or one or more other processes is discharged.

The feedback circuit 160 may be electrically connected to the shielding electrode NSE through a first power line VDL.

For example, the first power line VDL may be electrically connected to the shielding electrode NSE disposed in the display panel 110 while extending over a film COF on which the data driving circuit 130 is mounted.

The feedback line FBL may be electrically connected to a point on the shielding electrode NSE where the intensity of a constant voltage supplied to the shielding electrode NSE is the weakest. As shown in FIG. 6A, in the example where the feedback circuit 160 is located below the shielding electrode NSE in the plan view, the feedback line FBL may be electrically connected to at least one point of an upper edge of the shielding electrode NSE. The upper edge of the shielding electrode NSE may be the upper left corner and/or upper right corner of the shielding electrode NSE, for example.

The feedback circuit 160 may receive a feedback signal through the feedback line FBL from an area in which the intensity or fluctuation status of a constant voltage supplied to the shielding electrode NSE through the first power line VDL is the weakest or worst.

The feedback circuit 160 can output a compensation voltage based on a feedback signal received through the feedback line FBL to the shielding electrode NSE through the first power line VDL. Fluctuations of the voltage status of the shielding electrode NSE can be prevented, and thereby, the performance blocking noise by the shielding electrode NSE can be improved.

In another example, the feedback line FBL may be connected to the shielding electrode NSE at one or more other points. For example, as shown in FIG. 6B, the feedback line FBL may be electrically connected to the shielding electrode NSE in a middle portion of the display panel 110. For example, the feedback line FBL is connected at a center of a left side of the shielding electrode NSE and/or a center of a right side of the shielding electrode NSE. In this implementation, a point at which the first driving voltage VDD (see FIG. 2) is supplied to the shielding electrode NSE may correspond to a point at which the feedback line FBL is connected to the shielding electrode NSE.

In one or more embodiments, a plurality of feedback lines FBL may be disposed, and the touch display device 100 may include two or more feedback circuits 160.

For example, referring to FIG. 6C, the touch display device 100 may include a first feedback circuit 160a located at a lower edge of the display panel 110 and a second feedback circuit 160b located at an upper edge of the display panel 110.

The first feedback circuit 160a can supply the first driving voltage VDD to the shielding electrode NSE through a first power line VDL. The first feedback circuit 160a can receive a feedback signal through a feedback line FBL, add a signal obtained by inverting and amplifying the feedback signal to the first driving voltage VDD, and output a signal resulting from the adding to the shielding electrode NSE.

In a similar manner to the first feedback circuit 160a, the second feedback circuit 160b can supply the first driving voltage VDD to the shielding electrode NSE through a first power line VDL. The second feedback circuit 160b can receive a feedback signal through a feedback line FBL, add a signal obtained by inverting and amplifying the feedback signal to the first driving voltage VDD, and supply a signal resulting from the adding to the first power line VDL.

A point where the first power line VDL connected to the first feedback circuit 160a is connected to the shielding electrode NSE may be substantially the same as or different from a point where the first power line VDL connected to the second feedback circuit 160b is connected to the shielding electrode NSE.

A point where the feedback line FBL connected to the first feedback circuit 160a is connected to the shielding electrode NSE may be substantially the same as or different from a point where the feedback line FBL connected to the second feedback circuit 160b is connected to the shielding electrode NSE.

Since the feedback circuits 160a and 160b receive a feedback signal (or respective feedback signals), and after adding a signal obtained by inverting and amplifying the feedback signal (or the respective feedback signals) to a constant voltage, supply a signal resulting from the adding to the shielding electrode NSE, the occurrence of ripples of the voltage of an electrode layer of a light emitting element ED can be reduced, and the performance of touch sensing performed by a touch electrode TE located on the encapsulation layer ENCAP can be improved.

In addition, the shielding electrode NSE may be disposed in the display panel 110 in various structures, and one or more power lines for supplying a constant voltage to the shielding electrode NSE and one or more feedback lines FBL connected to the shielding electrode NSE may be disposed in various shapes or types, and/or various arrangement structures.

FIGS. 7 to 13 illustrate example structures in which a respective feedback line FBL is disposed in the touch display device 100 according to embodiments of the present disclosure. FIGS. 7 to 13 are various example cross-sectional views taken along line I-I' illustrated in FIG. 3. It should be noted here that some elements in the layer configuration of FIG. 4 are equally applied to layer configurations of FIGS. 7 to 13. Thus, the descriptions provided above with reference to FIG. 4 are provided for descriptions on such elements in the structures of FIGS. 7 to 13.

Figure 7:
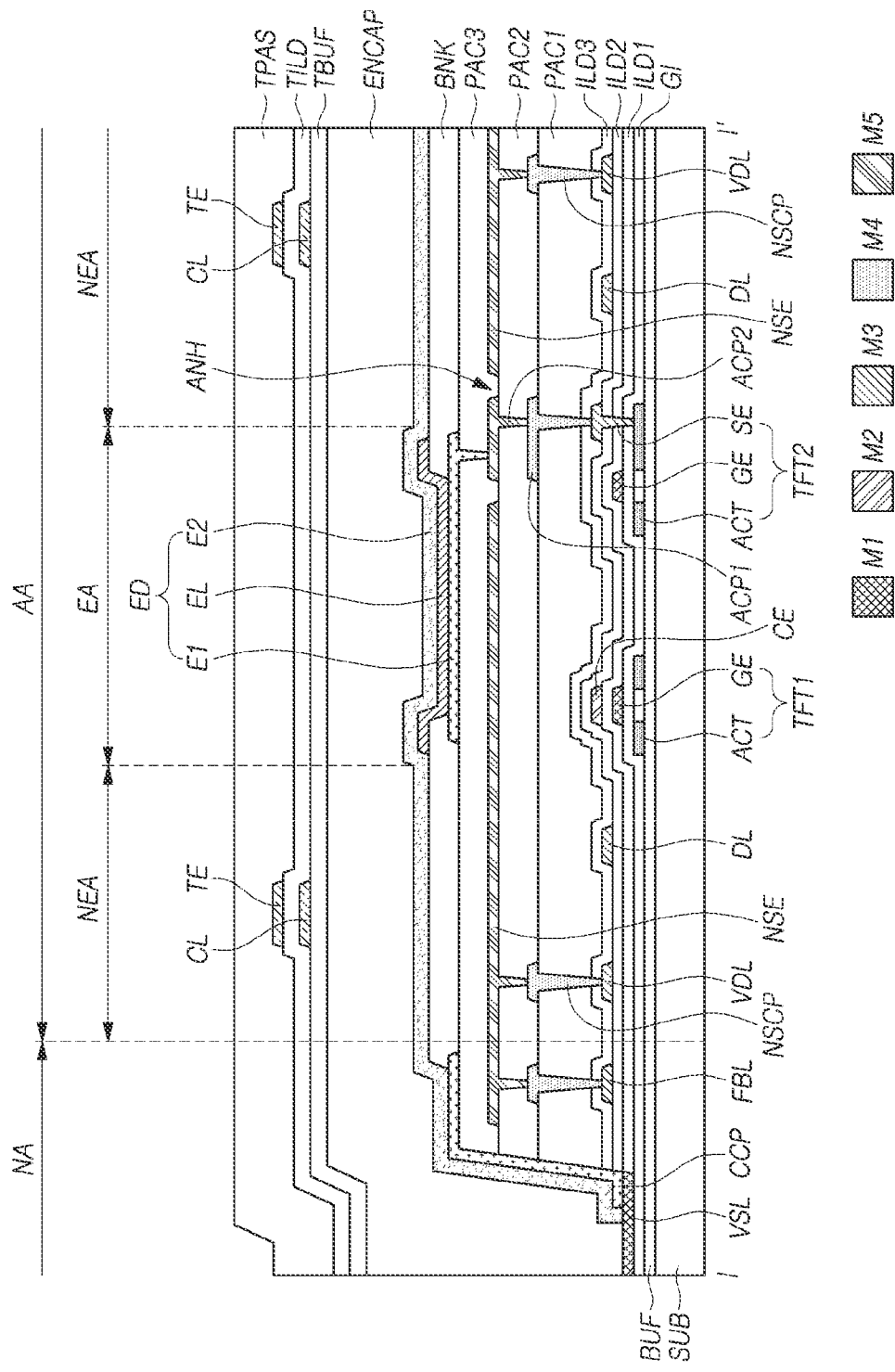
FIGS. 7 to 13 illustrate example structures in which a respective shielding electrode is disposed in the touch display device according to embodiments of the present disclosure.

Referring to FIG. 7, at least one signal line such as at least one data line DL, and the like may be disposed on the substrate SUB, and at least one light emitting element ED may be disposed over the signal line. At least one touch electrode TE may be disposed on the encapsulation layer ENCAP on the light emitting element ED.

A shielding electrode NSE may be located between a layer in which the signal line is disposed and a layer in which the light emitting element ED is disposed.

The shielding electrode NSE may be disposed using, for example, a fifth metal layer M5 located between a layer in which the fourth metal layer M4 is disposed and a layer in which the first electrode layer E1 is disposed. The second planarization layer PAC2 may be disposed under the fifth metal layer M5, and a third planarization layer PAC3 may be disposed on the fifth metal layer M5.

The shielding electrode NSE may be disposed in the active area AA. In this implementation, a portion of the shielding electrode NSE may be disposed in the non-active area NA.

The shielding electrode NSE may be electrically connected to a first power line VDL disposed in the active area AA. The shielding electrode NSE can receive the first driving voltage VDD (see FIG. 2) through the first power line VDL. A constant voltage such as the first driving voltage VDD can be supplied to the shielding electrode NSE, and the shielding electrode NSE can block coupling between the signal line such as the data line DL for display driving and a second electrode layer E2 of the light emitting element ED.

The shielding electrode NSE may be electrically connected to a feedback line FBL. The feedback line FBL may be connected to a point where the voltage drop of the constant voltage supplied to the shielding electrode NSE is greatest. In one or more embodiments, the feedback line FBL may be electrically connected to the shielding electrode NSE at a plurality of points.

For example, the feedback line FBL may be disposed in the non-active area NA and electrically connected to the shielding electrode NSE. In one or more embodiments, at least a portion of the feedback line FBL may be disposed in the active area AA and electrically connected to the shielding electrode NSE.

In the example of FIG. 7, the shielding electrode NSE may be electrically connected to the first power supply line VDL in the active area AA, and electrically connected to the feedback line FBL in the non-active area NA. As in the example of FIG. 7, the feedback line FBL may be disposed in the same layer as the first power line VDL, or in one or more embodiment, may be disposed in a different layer from the first power line VDL.

As the shielding electrode NSE is located under the second electrode layer E2 of the light emitting element ED, the feedback line FBL may be located between a portion in which the second electrode layer E2 is connected to a second power line VSL and a second electrode connection pattern CCP, and the active area AA.

The feedback line FBL may extend from the non-active area NA and be electrically connected to the feedback circuit 160.

The shielding electrode NSE can receive the first driving voltage VDD through the first power line VDL, and transmit a feedback signal to the feedback circuit 160 through the feedback line FBL. A compensation voltage obtained by adding a signal obtained by inverting and amplifying the feedback signal to the first driving voltage VDD can be output by the feedback circuit 160, and supplied to the shielding electrode NSE through the first power line VDL.

As the structure is implemented in which a compensation voltage based on a constant voltage and a feedback signal is supplied to the shielding electrode NSE located under an electrode layer of the light emitting element ED, the performance of blocking noise by the shielding electrode NSE can be improved and the performance of touch sensing by one or more touch electrodes TE can be improved.

Connection structures between the feedback line FBL and the shielding electrode NSE may be variously implemented according to arrangement structures of the shielding electrode NSE or connection structures between a power line for supplying a constant voltage to the shielding electrode NSE and the shielding electrode NSE.

Figure 8:
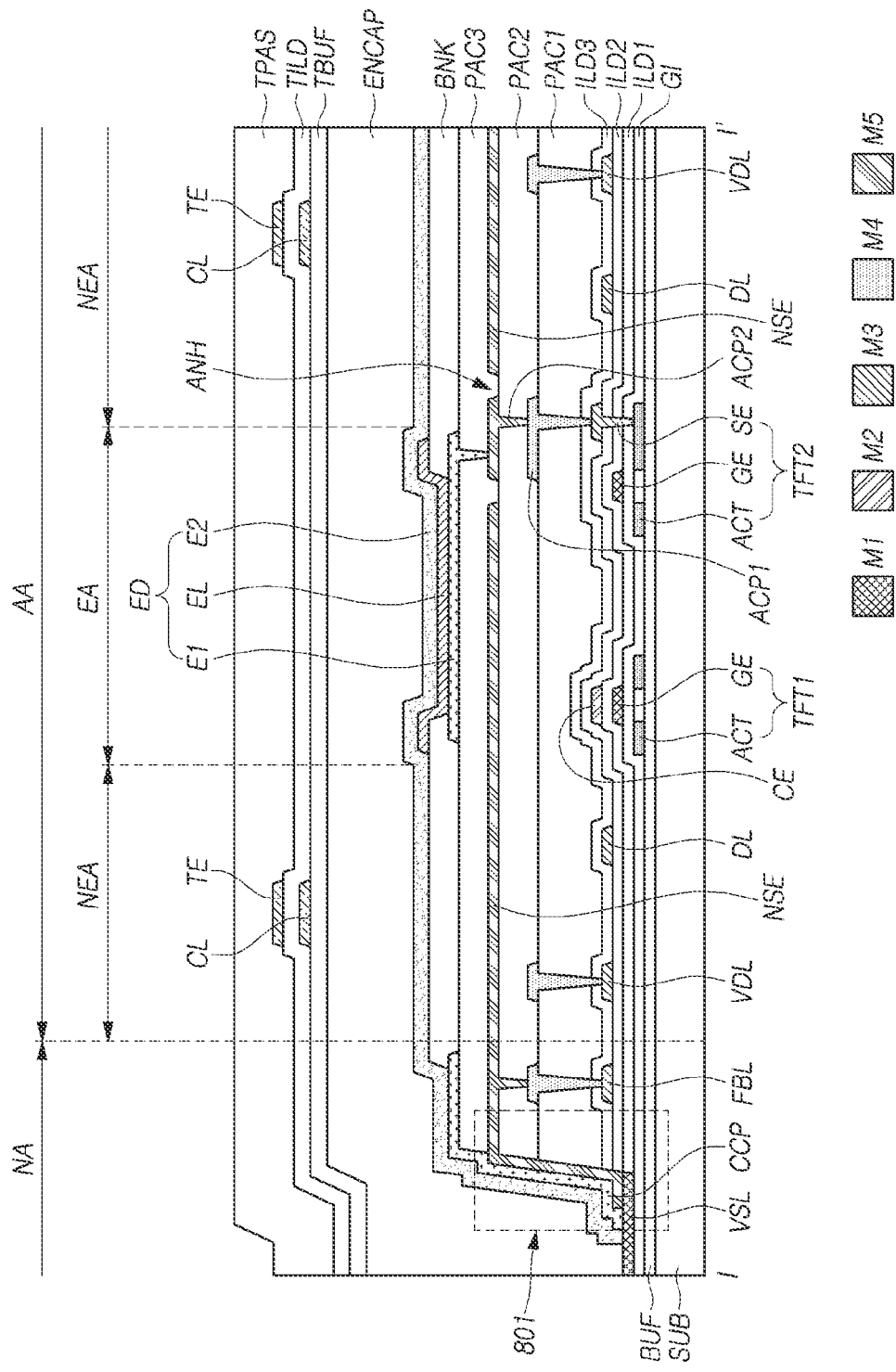

Referring to FIG. 8, a shielding electrode NSE may be located between the second planarization layer PAC2 and the third planarization layer PAC3. The shielding electrode NSE may overlap a signal line such as the data line DL over the substrate SUB, and block coupling between the signal line and the second electrode layer E2 of the light emitting element ED.

The shielding electrode NSE may be electrically connected to a second power line VSL for supplying the second driving voltage VSS (see FIG. 2). For example, as indicated by reference number 801, the shielding electrode NSE may be electrically connected to at least respective portions of a second electrode connection pattern CCP and the second power line VSL in the non-active area NA. The shielding electrode NSE and the feedback circuit 160 may be electrically connected through the second power line VSL.

In this implementation, a contact hole for a connection between the shielding electrode NSE and a power line may not be located in the active area AA.

As in the example of FIG. 8, the feedback line FBL may be disposed in the non-active area NA. In one or more embodiments, the feedback line FBL may be disposed in the active area AA. Since the feedback line FBL may be connected to a point where the drop of a voltage such as the second driving voltage VSS applied to the shielding electrode NSE is greatest, an area where the feedback line FBL is disposed may be located in various embodiments.

The feedback line FBL may be electrically connected to the shielding electrode NSE in the non-active area NA. The shielding electrode NSE may extend from a point connected to the feedback line FBL and be electrically connected to the second power line VSL. The feedback line FBL may be located between the second power line VSL and the active area AA.

A feedback signal can be supplied to the feedback circuit 160 through the feedback line FBL, and a compensation voltage based on the feedback signal can be supplied from the feedback circuit 160 to the shielding electrode NSE through the second power line VSL.

Noise caused by a voltage fluctuation in the shielding electrode NSE can be blocked, and the performance of blocking noise by the shielding electrode NSE can be improved.

In the example where the shielding electrode NSE receives a constant voltage such as the second driving voltage VSS while being connected to the second power line VSL, the shielding electrode NSE may be electrically connected to the second electrode layer E2 at one or more points of the active area AA.

Figure 9:
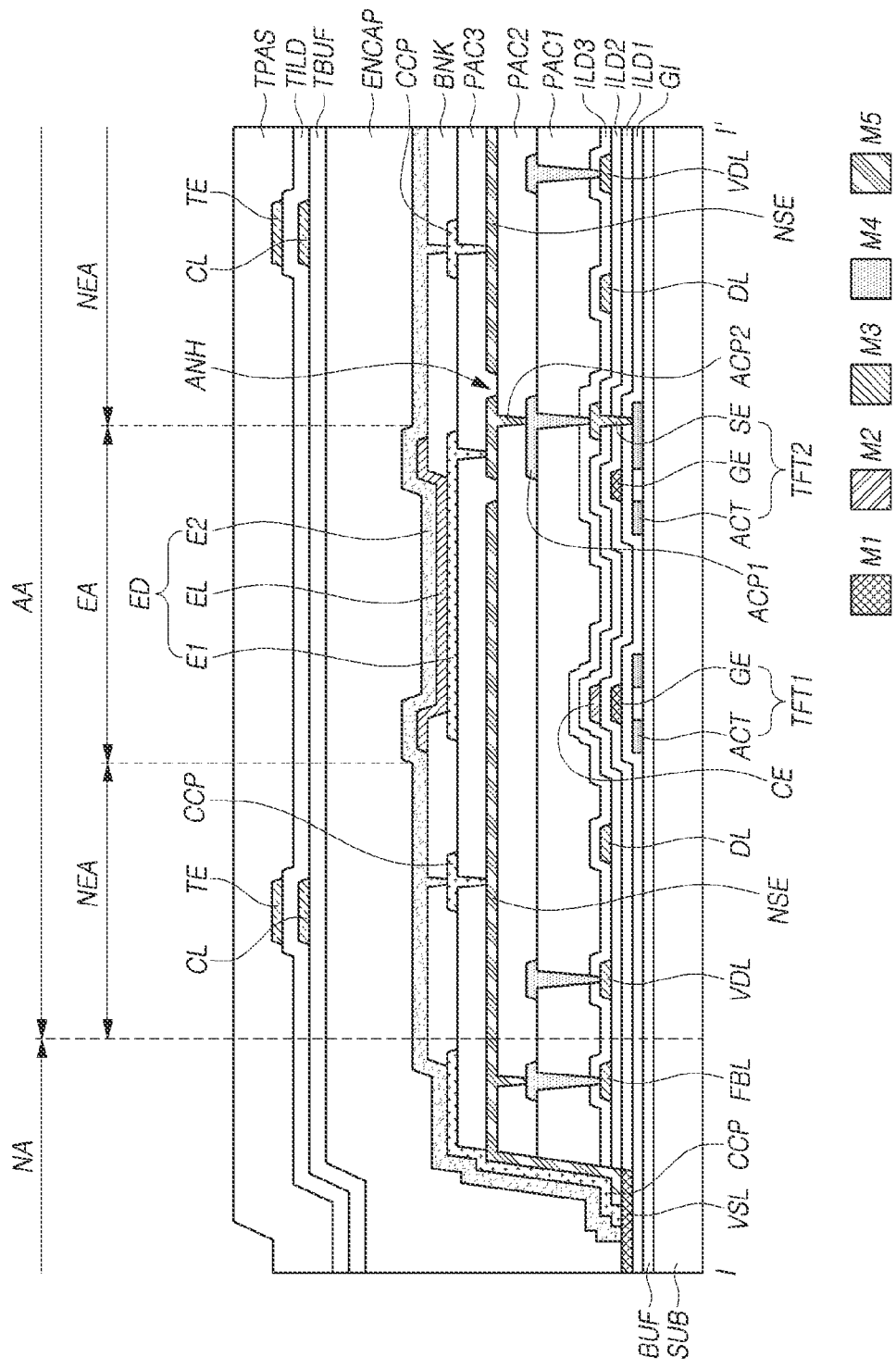

Referring to FIG. 9, a shielding electrode NSE may be electrically connected to the second power line VSL in the non-active area NA. The feedback line FBL may be disposed in the non-active area NA, and be electrically connected to the shielding electrode NSE in the non-active area NA.

In examples where the shielding electrode NSE receives a constant voltage such as the second driving voltage VSS through the second power line VSL, the shielding electrode NSE may be electrically connected to the second electrode layer E2 at one or more points of the active area AA.

For example, as shown in FIG. 9, the shielding electrode NSE may be electrically connected to the second electrode layer E2 through a second electrode connection pattern CCP disposed in the same layer as the first electrode layer E1 in the active area AA. The second electrode connection pattern CCP may include a same material as the first electrode layer E1.

The second electrode layer E2 may be connected to the second electrode connection pattern CCP through a contact hole formed in the bank layer BNK, and the second electrode connection pattern CCP may be electrically connected to the shielding electrode NSE through a contact hole formed in the third planarization layer PAC3.

The resistance of the second electrode layer E2 can be reduced by applying the structure in which the second electrode layer E2 is electrically connected to the shielding electrode NSE in the active area AA. The shielding electrode NSE can receive the second driving voltage VSS through at least one of the second power line VSL and the second electrode layer E2.

In the example where the shielding electrode NSE is electrically connected to the second electrode layer E2 in the active area AA, the shielding electrode NSE may not be connected to the second power line VSL in the non-active area NA. In this example, the shielding electrode NSE may have only a structure connected to the feedback line FBL in the non-active area NA.

The shielding electrode NSE may receive a constant voltage such as the second driving voltage VSS while being electrically connected to the second electrode layer E2 in the active area AA, and receive a compensation voltage, which is based on a feedback signal transmitted through the feedback line FBL, through the second power line VSL or the second electrode layer E2.

In one or more embodiments, in a structure in which the second electrode layer E2 is connected to a pattern using a metal layer disposed under the second electrode layer E2, the shielding electrode NSE can receive a constant voltage through a power line other than the second power line VSL.

Figure 10:
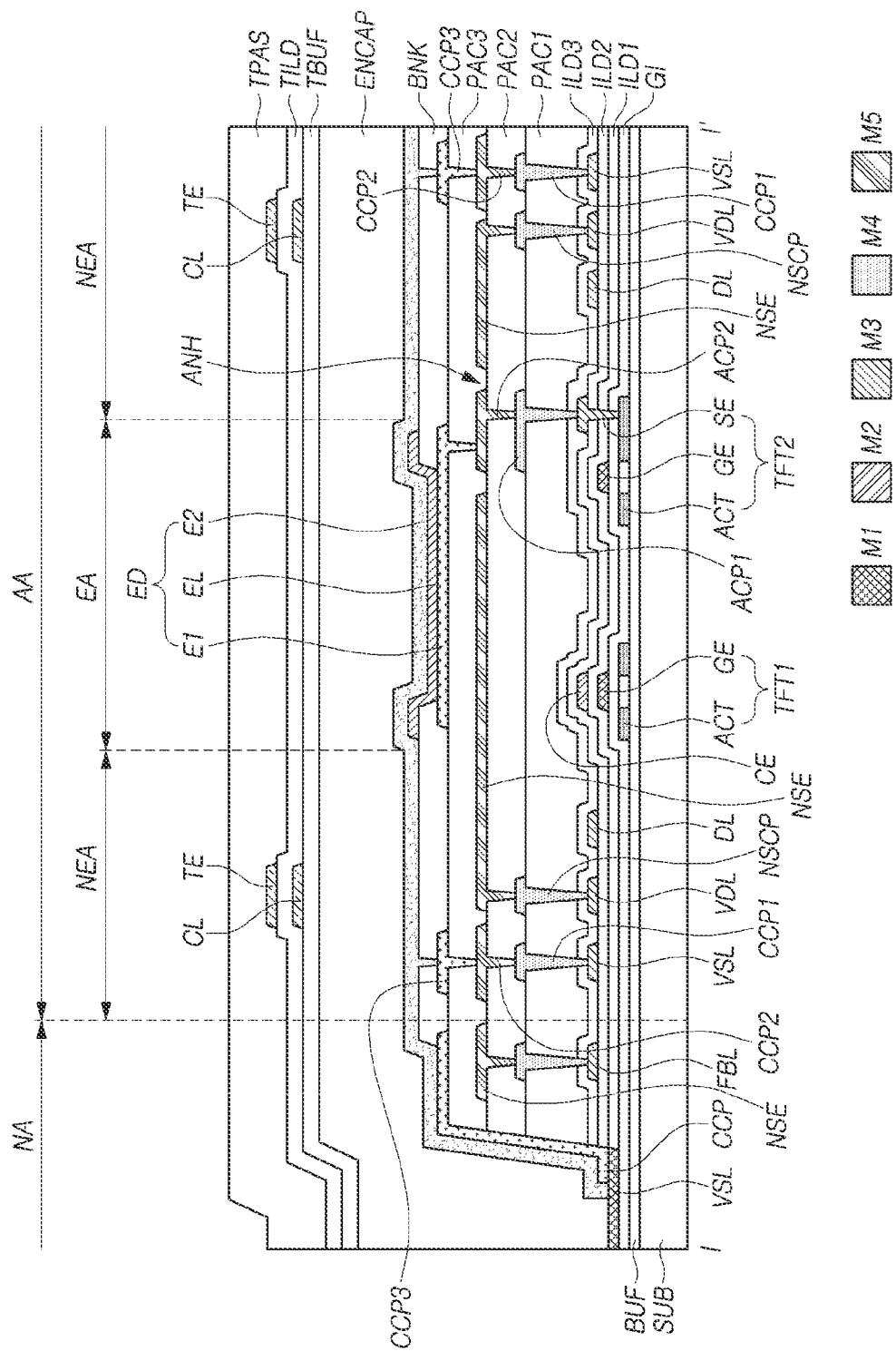

Referring to FIG. 10, a shielding electrode NSE may be disposed using the fifth metal layer M5.

The shielding electrode NSE may be electrically connected to a first power line VDL disposed in the active area AA.

The second electrode layer E2 of the light emitting element ED may be electrically connected to a second power line VSL in the active area AA. The second electrode layer E2 may be electrically connected to the second power line VSL through a plurality of second electrode connection patterns (CCP1, CCP2, and CCP3).

In one or more embodiments, a structure in which the shielding electrode NSE is electrically connected to the first power line VDL in the active area AA, and the second electrode layer E2 is electrically connected to the second power line VSL may be provided in the touch display device 100.

The resistance of the second electrode layer E2 can be reduced as the second electrode layer E2 is electrically connected to the second electrode connection patterns (CCP1 and CCP2) formed using the fourth metal layer M4 and the fifth metal layer M5, and the second electrode connection pattern CCP3 formed using a same material as the first electrode layer E1.

Coupling between a signal line such as the data line DL and the second electrode layer E2 can be prevented because an area where the second electrode connection patterns (CCP1, CCP2, and CCP3) are disposed does not overlap an area where the signal line is disposed.

Coupling between the signal line and the second electrode layer E2 can be prevented because the shielding electrode NSE is disposed in an area other than the area where the second electrode connection patterns (CCP1, CCP2, and CCP3) are disposed.

The shielding electrode NSE may include a hole located in an area where the second electrode connection pattern CCP2 formed using the fifth metal layer M5 is disposed. The shielding electrode NSE may be electrically connected to the feedback line FBL in the non-active area NA.

The shielding electrode NSE can receive the first driving voltage VDD (see FIG. 2) through the first power line VDL. The shielding electrode NSE can receive a compensation voltage, which is based on a feedback signal transmitted to the feedback circuit 160 through the feedback line FBL, through the first power line VDL.

The resistance of the second electrode layer E2 can be reduced by applying the structure in which the shielding electrode NSE and the second electrode connection pattern CCP are disposed in the same layer in the active area AA, and noise caused in the second electrode layer E2 can be blocked from affecting touch sensing.

As described above, the shielding electrode NSE can receive a constant voltage and a compensation voltage through the first power line VDL or the second power line VSL disposed for display driving in the display panel 110, and therefore, the display device 100 may not include a separate power line for driving the shielding electrode NSE. In one or more embodiments, the shielding electrode NSE may receive a constant voltage through a separate power line.

Figure 11:
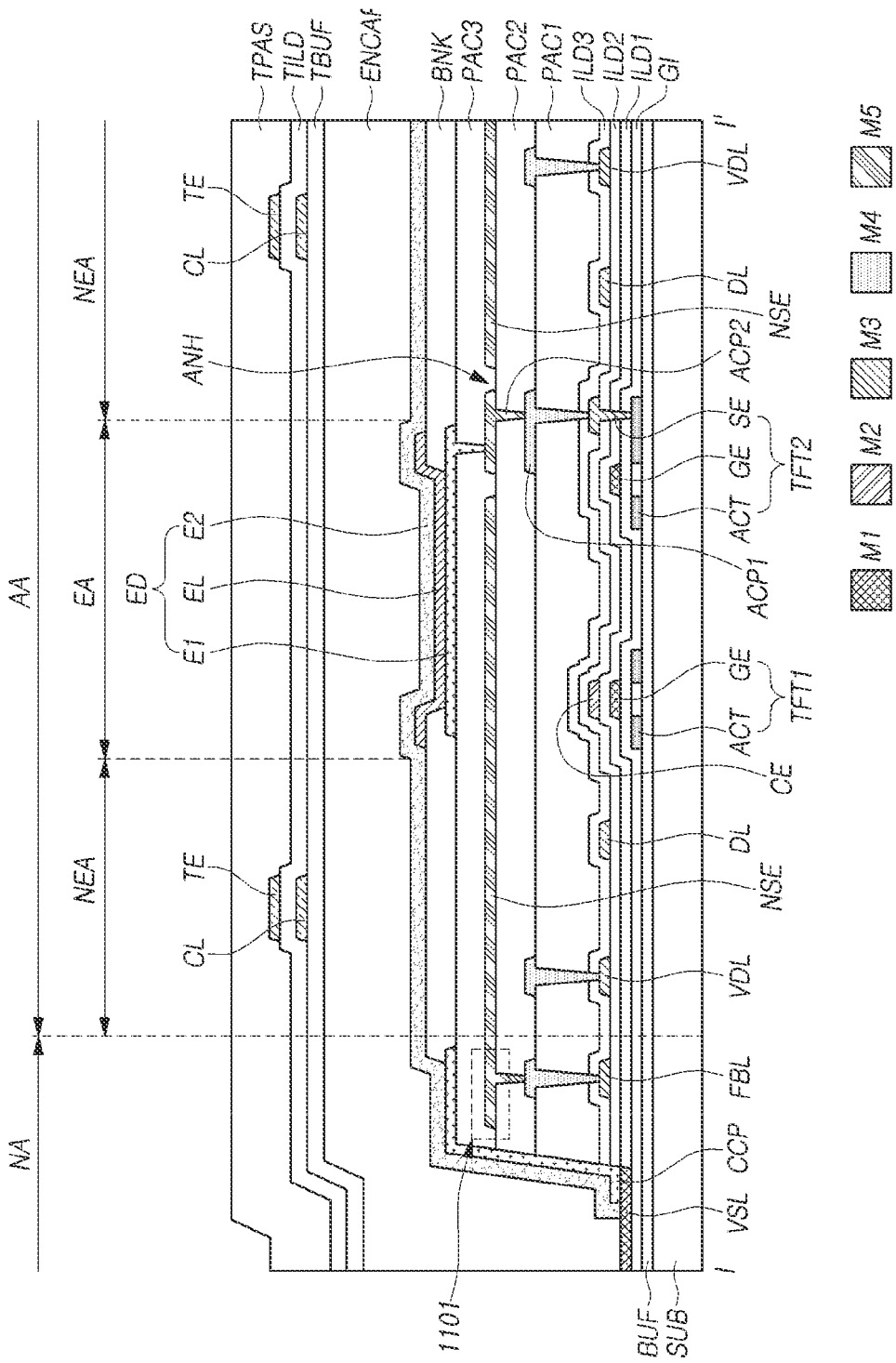

Referring to FIG. 11, a shielding electrode NSE may be disposed using the fifth metal layer M5.

The first power line VDL may be disposed in the active area AA of the display panel 110, and the second power line VSL may be disposed in the non-active area NA.

The shielding electrode NSE may not be electrically connected to the first power line VDL and the second power line VSL. The shielding electrode NSE may be electrically connected to a power line disposed separately from the first and second power lines.

For example, the shielding electrode NSE may be disposed to block noise in the active area AA, and may extend into the non-active area NA as indicated by reference number 1101.

The shielding electrode NSE can receive a constant voltage (e.g., a base voltage, a ground voltage, or the like) through the separate power line in the non-active area NA. The shielding electrode NSE may be electrically connected to the feedback line FBL in the non-active area NA.

The feedback line FBL may be electrically connected to the feedback circuit 160 and can transmit a feedback signal to the feedback circuit 160. The feedback circuit 160 can supply a compensation voltage based on the feedback signal to the shielding electrode NSE through the separate power line.

In this manner, such a structure in which the power line for supplying a constant voltage to the shielding electrode NSE and the feedback line FBL for transferring a feedback signal from the shielding electrode NSE to the feedback circuit 160 are disposed may be implemented in various embodiments.

The performance of blocking noise by the shielding electrode NSE can be improved because the feedback circuit 160 is electrically connected to at least one point of the shielding electrode NSE through the power line, is connected to at least one other point of the shielding electrode NSE through the feedback line FBL, and provides a compensation voltage based on the constant voltage and a feedback signal.

In one or more embodiments, the shielding electrode NSE for blocking noise in a touch sensing signal according to display driving may be disposed on the encapsulation layer ENCAP. Even when the shielding electrode NSE is located on the encapsulation layer ENCAP, a compensation voltage based on a constant voltage and a feedback signal can be supplied to the shielding electrode NSE, and the performance of blocking noise by the shielding electrode NSE can be improved.

Figure 12:
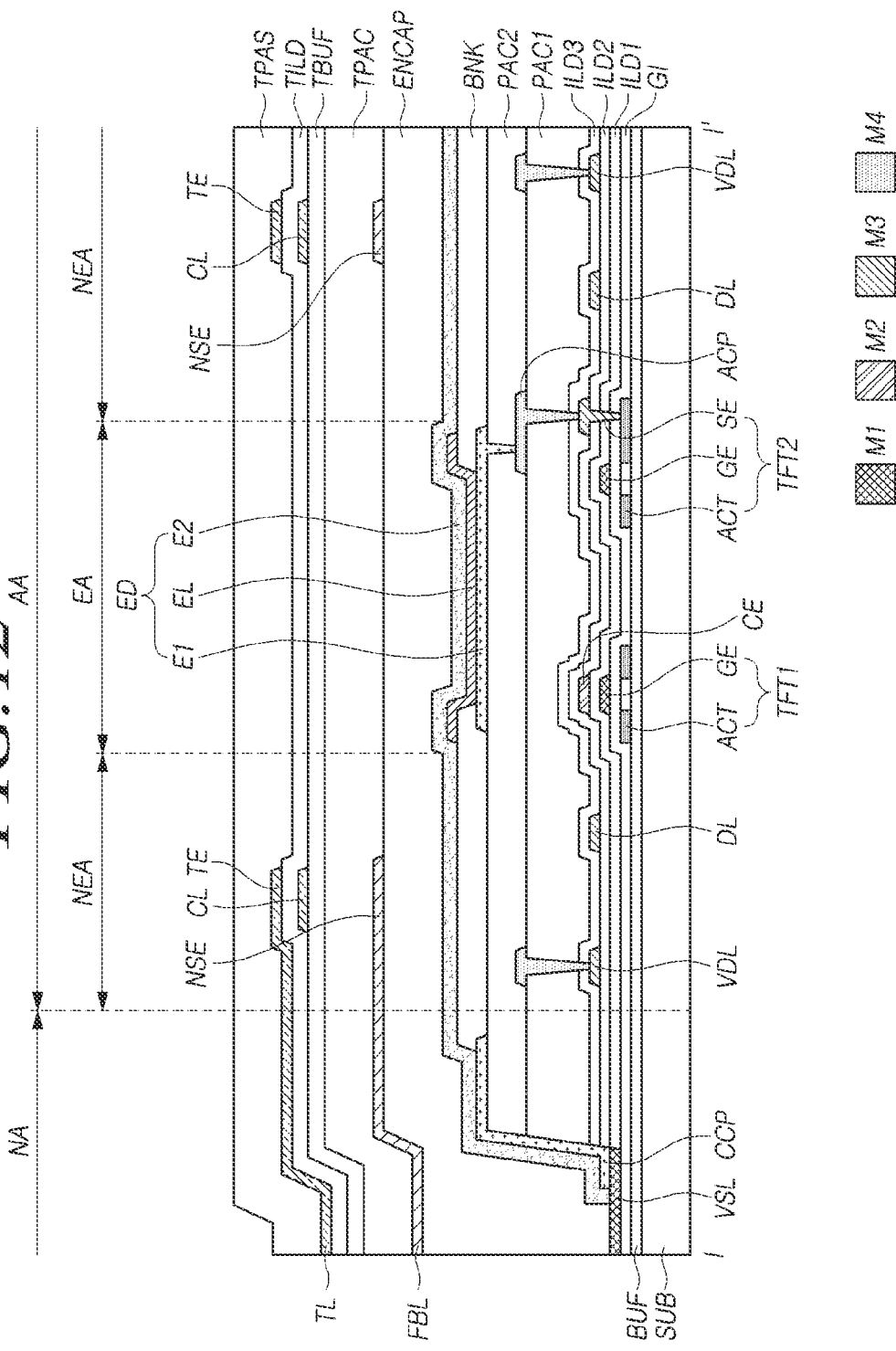

Referring to FIG. 12, a shielding electrode NSE may be disposed in at least a portion of the encapsulation layer ENCAP, for example, at least a portion of the upper surface of the encapsulation layer ENCAP.

The shielding electrode NSE may be disposed while avoiding a light emitting area EA of the light emitting element ED. The shielding electrode NSE may include, for example, an opaque metal. The shielding electrode NSE may be disposed in a shape corresponding to a touch electrode TE located over the shielding electrode NSE.

A touch planarization layer TPAC may be disposed on the shielding electrode NSE. The touch planarization layer TPAC may include, for example, an organic layer, but is not limited thereto.

The touch buffer layer TBUF may be disposed on the touch planarization layer TPAC. For example, the touch buffer layer TBUF may be formed in an inorganic layer, but is not limited thereto.

A thickness of the touch planarization layer TPAC may be greater than a thickness of the touch buffer layer TBUF.

As the touch planarization layer TPAC is disposed to have a constant thickness, a layer in which a touch electrode TE or a touch electrode connection pattern CL is disposed may become flat even when the shielding electrode NSE is disposed.

As the touch buffer layer TBUF is disposed on the touch planarization layer TPAC, therefore, the touch electrode TE or the touch electrode connection pattern CL can be easily disposed on the touch buffer layer TBUF.

The touch electrode connection pattern CL, the touch insulating layer TILD, at least one touch electrode TE, and the touch protection layer TPAS may be disposed on the touch buffer layer TBUF.

Since the shielding electrode NSE is located between the touch electrode TE and the second electrode layer E2 of the light emitting element ED, and is disposed to correspond to the touch electrode TE (e.g., overlap the touch electrode TE), display noise caused by the second electrode layer E2 may be blocked from being transferred to the touch electrode TE.

The shielding electrode NSE may receive a constant voltage through a power line. In one or more embodiments, the shielding electrode NSE may be electrically connected to the feedback circuit 160 through a feedback line FBL.

In one or more embodiments, the power line for supplying a constant voltage to the shielding electrode NSE and the feedback line FBL may be disposed in a same layer as a layer in which the shielding electrode NSE is disposed. In one or more embodiments, at least respective portions of the power line and the feedback line FBL may be disposed in a layer where the touch electrode TE or the touch electrode connection pattern CL is disposed.

The power line and the feedback line FBL may be disposed along an inclined surface of the encapsulation layer ENCAP in the non-active area NA, and be electrically connected to the feedback circuit 160.

The feedback circuit 160 can supply a compensation voltage based on a feedback signal received through the feedback line FBL to the shielding electrode NSE through the power line.

Parasitic capacitance between the second electrode layer E2 and the touch electrode TE can be reduced by the shielding electrode NSE, and thereby, noise in a touch sensing signal can be reduced. In addition, fluctuations in a voltage of the shielding electrode NSE by coupling between the second electrode layer E2 and the shielding electrode NSE can be prevented from acting as noise to the touch electrode TE.

While the shielding electrode NSE disposed on the encapsulation layer ENCAP is disposed in a form corresponding to a touch electrode TE, to improve noise blocking performance. a portion of the shielding electrode NSE may be disposed to overlap the light emitting area EA.

Figure 13:
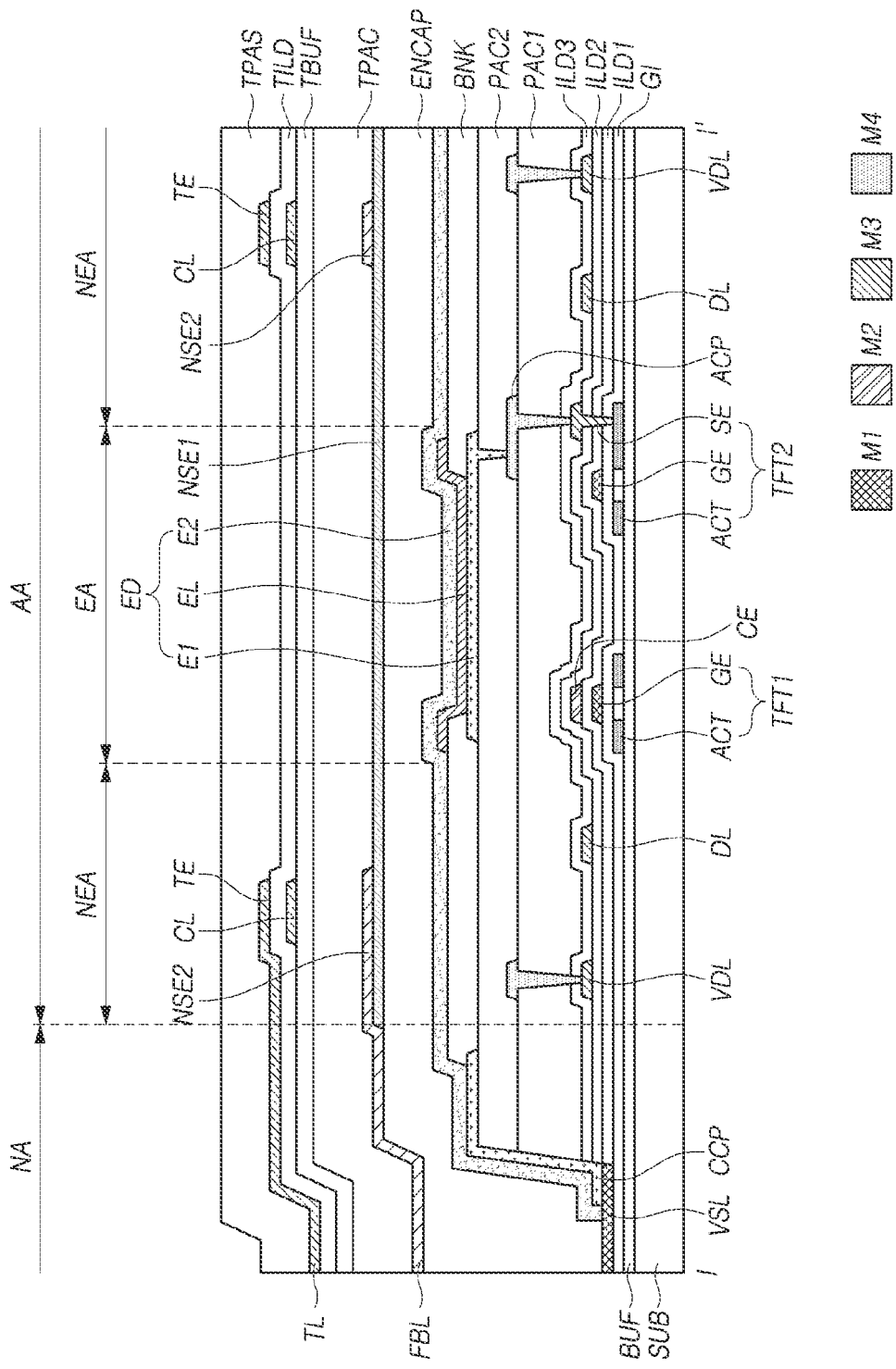

Referring to FIG. 13, a shielding electrode NSE may be disposed on the encapsulation layer ENCAP The shielding electrode NSE may include a first shielding electrode NSE1 and a second shielding electrode NSE2.

The first shielding electrode NSE1 may be disposed on the encapsulation layer ENCAP and may include a material having high transparency.

For example, the first shielding electrode NSE1 may be disposed in the entire area of the active area AA. That is, the first shielding electrode NSE1 is disposed across an entirety of the active area AA. In one or more embodiments, the first shielding electrode NSE1 may be disposed to overlap an area other than at least one light emitting area EA in the active area AA. In one or more embodiments, the first shielding electrode NSE1 may be disposed to overlap an area other than at least one light emitting area EA, and disposed in a portion of a respective area overlapping the at least one light emitting areas EA.

The second shielding electrode NSE2 may be disposed on the first shielding electrode NSE1. In one or more embodiments, the second shielding electrode NSE2 may be disposed between the encapsulation layer ENCAP and the first shielding electrode NSE1.

The second shielding electrode NSE2 may include, for example, an opaque metal. The second shielding electrode NSE2 may be disposed by avoiding the light emitting area EA. Thus, the second shielding electrode NSE2 is non-overlapping with the light emitting area EA. The second shielding electrode NSE2 may be disposed in a form corresponding to a touch electrode TE. That is, second shielding electrode NSE2 overlaps the touch electrode TE.

In one or more embodiments, the second shielding electrode NSE2 and the first shielding electrode NSE1 may be disposed in direct contact with each other. In one or more embodiments, the second shielding electrode NSE2 and the first shielding electrode NSE1 may be disposed with at least one insulating layer interposed therebetween, and be electrically connected through a contact hole of the insulating layer.

Coupling between the second electrode layer E2 and the touch electrode TE in an area overlapped with the touch electrode TE can be blocked by the second shielding electrode NSE2, and parasitic capacitance that may be formed with the second electrode layer E2 in a sideways direction of the touch electrode TE can be reduced by the first shielding electrode NSE1.

A constant voltage can be supplied to the shielding electrode NSE including the first shielding electrode NSE1 and the second shielding electrode NSE2. In one or more embodiments, a feedback signal can be transmitted to the feedback circuit 160 through the feedback line FBL through at least a respective portion of each, or at least a portion of any one, of the first shielding electrode NSE1 and the second shielding electrode NSE2. The feedback circuit 160 can supply a compensation voltage obtained by inverting and amplifying a feedback signal to the first shielding electrode NSE1 and the second shielding electrode NSE2.

In the example where the shielding electrode NSE includes the first shielding electrode NSE1 and the second shielding electrode NSE2, a power supply line for supplying a constant voltage to the shielding electrode NSE and the feedback line FBL may be disposed using a same material as the second shielding electrode NSE2 having a low resistance. In one or more embodiments, the power line and the feedback line FBL may be disposed using a same material as the touch electrode TE or a touch electrode connection pattern CL.

In this manner, even when the shielding electrode NSE is disposed on the encapsulation layer ENCAP, by supplying a compensation voltage based on a feedback signal received from the shielding electrode NSE to the shielding electrode NSE, the performance of blocking noise by the shielding electrode NSE can be improved, and the performance of touch sensing by the touch electrode TE located on the encapsulation layer ENCAP can be improved.

The embodiments described above will be briefly described as follows.

According to the embodiments described herein, the touch display device 100 may include a substrate SUB including an active area AA in which a plurality of subpixels SP are disposed and a non-active area NA located outside of the active area AA, a plurality of signal lines and a plurality of power lines disposed over the substrate SUB, a plurality of light emitting elements ED located over the plurality of signal lines and the plurality of power lines, an encapsulation layer ENCAP disposed on the plurality of light emitting elements ED, a plurality of touch electrodes TE disposed on the encapsulation layer ENCAP, a shielding electrode NSE located between a layer in which the plurality of signal lines are disposed and a layer in which the plurality of light emitting elements ED are disposed, and electrically connected to at least one of the plurality of power lines, at least one feedback line FBL electrically connected to the shielding electrode NSE, and a feedback circuit 160 configured to receive a feedback signal through the at least one feedback line FBL, and output a compensation voltage based on the feedback signal to a power line electrically connected to the shielding electrode NSE among the plurality of power lines.

The power line electrically connected to the shielding electrode NSE can supply a voltage for driving the plurality of subpixels SP.

In one or more embodiments, the power line electrically connected to the shielding electrode NSE may be insulated from elements disposed in the plurality of subpixels SP.

The number of points where the shielding electrode NSE is connected to the at least one feedback line FBL may be less than the number of points where the shielding electrode NSE is connected to at least one of the plurality of power lines.

The shielding electrode NSE may be electrically connected to at least one of the plurality of power lines in the active area AA, and be electrically connected to the at least one feedback line FBL in the non-active area NA.

The at least one feedback line FBL may be located between the power line electrically connected to the shielding electrode NSE and the active area AA.

A portion of the at least one feedback line FBL may be located in the active area AA.

The shielding electrode NSE may include a plurality of holes located in the active area AA.

The shielding electrode NSE may overlap one or more, or at least a respective portion of the one or more of, the plurality of light emitting elements ED.

Each of the plurality of light emitting elements ED may include a first electrode layer E1, an emission layer EL on the first electrode layer E1, and a second electrode layer E2 on the emission layer EL, and the shielding electrode NSE may be electrically connected to the second electrode layer E2 in the active area AA.

The shielding electrode NSE may be electrically connected to the second electrode layer E2 through a connection pattern including a same material as the first electrode layer E1.

The touch display device 100 may further include a first electrode connection pattern disposed in the same layer as a layer in which the shielding electrode NSE is disposed, and electrically connected to the first electrode layer E1.

According to the embodiments described herein, the touch display device 100 may include a plurality of power lines for supplying voltages for display driving to a plurality of subpixels SP disposed in a display panel 110, a shielding electrode NSE located between a layer in which a plurality of signal lines for supplying signals for display driving to the plurality of subpixels SP are disposed and a layer in which a plurality of touch electrodes TE included in the display panel 110 are disposed, and electrically connected to at least one of the plurality of power lines, at least one feedback line FBL electrically connected to the shielding electrode NSE, and a feedback circuit 160 configured to receive a feedback signal through the at least one feedback line FBL, and output a compensation voltage based on the feedback signal received through the at least one feedback line to a power line electrically connected to the shielding electrode.

The touch display device 100 may further include a plurality of light emitting elements ED located between a layer in which the shielding electrode NSE is disposed and a layer in which the plurality of touch electrodes TE are disposed.

The at least one feedback line FBL may be electrically connected to an electrode layer included in each, or one or more, of the plurality of light emitting elements ED through the shielding electrode NSE.

According to the embodiments described herein, the touch display device 100 may include a plurality of light emitting elements ED disposed in an active area AA, an encapsulation layer ENCAP on the plurality of light emitting elements ED, a plurality of touch electrodes TE on the encapsulation layer ENCAP, a shielding electrode NSE located between the encapsulation layer ENCAP and the plurality of touch electrodes TE, at least one feedback line FBL electrically connected to the shielding electrode NSE, and a feedback circuit 160 configured to receive a feedback signal through the at least one feedback line FBL, and output a compensation voltage based on the feedback signal to the shielding electrode NSE.

The shielding electrode NSE may be disposed to correspond to the plurality of touch electrodes TE.

The shielding electrode NSE may include a first shielding electrode NSE1 disposed in the entire area of the active area AA on the encapsulation layer ENCAP and including a transparent material, and a second shielding electrode NSE2 located on the first shielding electrode NSE1 or between the encapsulation layer ENCAP and the first shielding electrode NSE1, corresponding to the plurality of touch electrodes TE, and including an opaque material.

The at least one feedback line FBL may include a same material as the second shielding electrode NSE2.

The touch display device 100 may further include a first insulating layer on the shielding electrode NSE, and a second insulating layer located between the first insulating layer and the plurality of touch electrodes TE. A thickness of the first insulating layer may be greater than a thickness of the second insulating layer.

The above description has been presented to enable any person skilled in the art to make, use and practice the technical features of the present invention, and has been provided in the context of a particular application and its requirements as examples. Various modifications, additions and substitutions to the described embodiments will be readily apparent to those skilled in the art, and the principles described herein may be applied to other embodiments and applications without departing from the scope of the present invention. The above description and the accompanying drawings provide examples of the technical features of the present invention for illustrative purposes only. That is, the disclosed embodiments are intended to illustrate the scope of the technical features of the present invention. Thus, the scope of the present invention is not limited to the embodiments shown, but is to be accorded the widest scope consistent with the claims.

What is claimed is:

1. A touch display device comprising:
   a substrate comprising an active area and a non-active area outside of the active area, the active area comprising a plurality of subpixels;
   a plurality of signal lines and a plurality of power lines over the substrate;
   a plurality of light emitting elements over the plurality of signal lines and the plurality of power lines;
   an encapsulation layer on the plurality of light emitting elements;
   a plurality of touch electrodes on the encapsulation layer;
   a shielding electrode between a layer that comprises the plurality of signal lines and a layer that comprises the plurality of light emitting elements, the shielding electrode overlapping with at least one of the plurality of light emitting elements in a plan view, the shielding electrode electrically connected to at least one power line from the plurality of power lines;
   at least one feedback line electrically connected to the shielding electrode; and
   a feedback circuit configured to receive a feedback signal from the shielding electrode via the at least one feedback line, and output a compensation voltage based on the feedback signal to the at least one power line that is electrically connected to the shielding electrode.

2. The touch display device of claim 1, wherein the at least one power line that is electrically connected to the shielding electrode supplies to the shielding electrode a voltage for driving the plurality of subpixels.

3. The touch display device of claim 1, wherein the shielding electrode is connected to the at least one feedback line at a plurality of first points and the shielding electrode is connected to the at least one power line at a plurality of second points, wherein a total number of the plurality of first points is less than a total number of the plurality of second points.

4. The touch display device of claim 1, wherein the shielding electrode is electrically connected to the at least one power line in the active area, and the shielding electrode is electrically connected to the at least one feedback line in the non-active area.

5. The touch display device of claim 1, wherein the at least one feedback line is located between the active area and the at least one power line that is electrically connected to the shielding electrode.

6. The touch display device of claim 1, wherein the shielding electrode comprises a plurality of holes in the active area.

7. The touch display device of claim 1, wherein each of the plurality of light emitting elements comprises a first electrode layer, an emission layer on the first electrode layer, and a second electrode layer on the emission layer, and the shielding electrode is electrically connected to the second electrode layer in the active area.

8. The touch display device of claim 7, further comprising:
   a connection pattern that includes a same material as the first electrode layer, the connection pattern electrically connecting the shielding electrode to the second electrode layer; and
   an electrode connection pattern in a same layer as the shielding electrode, the electrode connection pattern electrically connected to the first electrode layer.

9. A touch display device comprising:
   a plurality of light emitting elements in an active area of the touch display device;
   an encapsulation layer on the plurality of light emitting elements;
   a plurality of touch electrodes on the encapsulation layer;
   a shielding electrode between the encapsulation layer and the plurality of touch electrodes, the shielding electrode overlapping with at least one of the plurality of light emitting elements in a plan view;
   at least one feedback line electrically connected to the shielding electrode; and
   a feedback circuit configured to receive a feedback signal from the shielding electrode via the at least one feedback line, and output a compensation voltage based on the feedback signal to the shielding electrode.

10. The touch display device of claim 9, wherein the shielding electrode is disposed overlaps to the plurality of touch electrodes.

11. The touch display device of claim 9, wherein the shielding electrode comprises:
    a first shielding electrode on the encapsulation layer across an entirety of the active area, the first shielding electrode including a transparent material, and
    a second shielding electrode on the first shielding electrode or between the encapsulation layer and the first shielding electrode and the second shielding electrode overlapping the plurality of touch electrodes, the second shielding electrode comprising an opaque material.

12. The touch display device of claim 11, wherein the at least one feedback line comprises a same material as the second shielding electrode.

13. The touch display device of claim 9, further comprising:
    a first insulating layer on the shielding electrode; and
    a second insulating layer between the first insulating layer and the plurality of touch electrodes,
    wherein a thickness of the first insulating layer is greater than a thickness of the second insulating layer.

14. A touch display device comprising:
- a substrate including an active area and a non-active area outside of the active area;
- a signal line on the active area of the substrate, the signal line supplying a data signal;
- a power line on the substrate, the power line supplying a first voltage;
- a light emitting element in the active area, the light emitting element configured to emit light according to the data signal;
- an encapsulation layer over the light emitting element;
- a plurality of touch electrodes on the encapsulation layer;
- a shielding electrode between the signal line and the plurality of touch electrodes, the shielding electrode overlapping with the light emitting element in a plan view, the shielding electrode connected to the power line and receives the first voltage from the power line;
- a feedback line connected to the shielding electrode, the feedback line receiving a feedback signal from the shielding electrode that is indicative of noise on the first voltage supplied to the shielding electrode due to the data signal; and
- a feedback circuit connected to the feedback line, the feedback circuit configured to receive the feedback signal via the feedback line and output a second voltage to the power line that is based on the first voltage and the feedback signal.

15. The touch display device of claim 14, wherein the shielding electrode is between the signal line and the light emitting element, and the shielding electrode overlaps at least a portion of the light emitting element.

16. The touch display device of claim 14, wherein the shielding electrode is between the light emitting element and the plurality of touch electrodes.

17. The touch display device of claim 14, further comprising:
- a subpixel including the light emitting element, the subpixel supplied the first voltage.

18. The touch display device of claim 14, wherein the power line is in the active area and the shielding electrode is electrically connected to the power line in the active area, and the feedback line is in the non-active area and the shielding electrode is electrically connected to the feedback line in the non-active area.

19. The touch display device of claim 14, wherein the feedback line and the power line are located in the non-active area, and the feedback line is between the active area and the power line.

20. The touch display device of claim 14, wherein the shielding electrode comprises a hole through a thickness of the shielding electrode, and the touch display device further comprising:
- a transistor; and
- an electrode connection pattern in the hole of the shielding electrode, the transistor electrically connected to the light emitting element via the electrode connection pattern.

* * * * *